(12) United States Patent
Ovadia et al.

(10) Patent No.: US 12,015,677 B2
(45) Date of Patent: Jun. 18, 2024

(54) METHODS AND APPARATUS FOR SUPPORTING PLATFORM AND APPLICATION DEVELOPMENT AND OPERATION

(71) Applicant: Charter Communications Operating, LLC, St. Louis, MO (US)

(72) Inventors: Shlomo Ovadia, Denver, CO (US); Michael Kloberdans, Brighton, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/844,632

(22) Filed: Jun. 20, 2022

(65) Prior Publication Data
US 2022/0321675 A1    Oct. 6, 2022

Related U.S. Application Data

(62) Division of application No. 16/573,770, filed on Sep. 17, 2019, now Pat. No. 11,368,552.

(51) Int. Cl.
*H04L 67/00*        (2022.01)
*H04L 41/0806*    (2022.01)

(52) U.S. Cl.
CPC .......... *H04L 67/34* (2013.01); *H04L 41/0806* (2013.01)

(58) Field of Classification Search
CPC ............. H04L 12/2814; H04L 12/2803; H04L 12/2821; H04L 2012/2849; H04L 12/2805;
(Continued)

(56) References Cited

U.S. PATENT DOCUMENTS 5,664,046 A    9/1997 Abecassis
5,995,499 A    11/1999 Hottinen et al.
(Continued)

FOREIGN PATENT DOCUMENTS

CA    2546598 C    12/2011
CA    2643806 C    6/2013
(Continued)

OTHER PUBLICATIONS

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
(Continued)

*Primary Examiner* — David R Lazaro
(74) *Attorney, Agent, or Firm* — Patent Beach PC

(57) ABSTRACT

Apparatus and methods related to on-boarding software applications on a platform used in a content delivery and/or service provider network. In one embodiment, a centralized platform such as a premises gateway is provided to act as an application portal or store for all consumer devices that connects to a service provider network. In one variant, a software architecture is provided for the gateway which includes at least one of an open-sourced OS (e.g., OpenWrt) and containerization engine (e.g., Docker) which enables a broader range of application compatibility with the gateway itself and end user devices within the premises by abstracting the services and functions above the specific hardware/firmware configurations of each of the end user devices.

20 Claims, 16 Drawing Sheets

(58) Field of Classification Search
CPC .............. H04L 12/2807; H04L 12/281; H04L 12/2812; H04L 12/2818; H04L 12/283
See application file for complete search history.

(56) References Cited

U.S. PATENT DOCUMENTS

| | | | |
|---|---|---|---|
| 6,154,648 A | 11/2000 | Comer | |
| 6,192,403 B1 | 2/2001 | Jong et al. | |
| 6,317,881 B1 | 11/2001 | Shah-Nazaroff et al. | |
| 6,469,742 B1 | 10/2002 | Trovato et al. | |
| 6,542,739 B1 | 4/2003 | Garner | |
| 6,546,419 B1 | 4/2003 | Humpleman et al. | |
| 6,757,837 B1 * | 6/2004 | Platt | G06F 11/0793 714/38.14 |
| 6,948,183 B1 | 9/2005 | Peterka | |
| 7,058,964 B2 | 6/2006 | Khandelwal et al. | |
| 7,266,726 B1 | 9/2007 | Ladd et al. | |
| 7,293,201 B2 * | 11/2007 | Ansari | G06F 11/0748 714/48 |
| 7,487,534 B1 | 2/2009 | Peterka et al. | |
| 7,592,912 B2 | 9/2009 | Hasek et al. | |
| 7,602,820 B2 | 10/2009 | Helms et al. | |
| 7,698,606 B2 | 4/2010 | Ladd et al. | |
| 8,024,607 B2 | 9/2011 | Ladd et al. | |
| 8,046,636 B2 | 10/2011 | Ladd et al. | |
| 8,095,610 B2 | 1/2012 | Gould et al. | |
| 8,170,065 B2 | 5/2012 | Hasek et al. | |
| 8,302,111 B2 | 10/2012 | Ladd et al. | |
| 8,321,723 B2 | 11/2012 | Ladd et al. | |
| 8,718,100 B2 | 5/2014 | Markley et al. | |
| 8,719,847 B2 * | 5/2014 | Agarwal | H04L 12/2814 719/321 |
| 8,799,723 B2 | 8/2014 | Ladd et al. | |
| 8,997,136 B2 | 3/2015 | Brooks et al. | |
| 9,185,341 B2 | 11/2015 | Hardin | |
| 9,213,538 B1 | 12/2015 | Ladd et al. | |
| 9,264,751 B2 | 2/2016 | Sarosi et al. | |
| 9,300,445 B2 | 3/2016 | Hardin | |
| 9,398,336 B2 | 7/2016 | Markley et al. | |
| 9,414,111 B2 | 8/2016 | Hasek et al. | |
| 9,472,091 B2 | 10/2016 | Stern et al. | |
| 9,479,404 B2 | 10/2016 | Ladd et al. | |
| 9,503,477 B2 * | 11/2016 | May | H04L 63/10 |
| 9,699,663 B1 | 7/2017 | Jovancevic | |
| 10,098,568 B2 | 10/2018 | Gazdzinski | |
| 10,164,858 B2 | 12/2018 | Gunasekara et al. | |
| 10,269,229 B2 | 4/2019 | Stern et al. | |
| 10,340,976 B2 | 7/2019 | Kakinada et al. | |
| 10,405,192 B2 | 9/2019 | Kakinada et al. | |
| 10,452,342 B2 * | 10/2019 | Triplett | G05B 15/02 |
| 10,492,204 B2 | 11/2019 | Kakinada et al. | |
| 10,498,611 B1 * | 12/2019 | Kloberdans | H04L 41/40 |
| 10,536,859 B2 | 1/2020 | Gunasekara et al. | |
| 10,616,077 B2 * | 4/2020 | Kloberdans | H04L 41/5054 |
| 10,877,741 B2 * | 12/2020 | Talbert | H04L 67/34 |
| 10,885,569 B2 * | 1/2021 | Ogaz | G06Q 30/02 |
| 10,966,073 B2 | 3/2021 | Petersen | |
| 10,979,768 B2 | 4/2021 | Sarosi et al. | |
| 10,991,227 B2 | 4/2021 | Stern et al. | |
| 11,026,205 B2 | 6/2021 | Hmimy et al. | |
| 11,102,560 B2 | 8/2021 | Hoole et al. | |
| 11,182,222 B2 | 11/2021 | Ovadia et al. | |
| 11,190,861 B2 | 11/2021 | Bali | |
| 11,219,026 B2 | 1/2022 | Kakinada et al. | |
| 11,368,552 B2 * | 6/2022 | Ovadia | H04L 67/34 |
| 11,374,779 B2 | 6/2022 | Sanders et al. | |
| 11,432,284 B2 | 8/2022 | Hmimy et al. | |
| 11,438,771 B2 | 9/2022 | Syed et al. | |
| 11,457,485 B2 | 9/2022 | Khalid et al. | |
| 2001/0049691 A1 | 12/2001 | Asazu | |
| 2002/0032754 A1 | 3/2002 | Logston et al. | |
| 2002/0078161 A1 | 6/2002 | Cheng | |
| 2002/0122040 A1 | 9/2002 | Noyle | |
| 2002/0122656 A1 | 9/2002 | Gates et al. | |
| 2003/0009567 A1 | 1/2003 | Farouk | |
| 2003/0121054 A1 | 6/2003 | Lorenz | |
| 2003/0158906 A1 * | 8/2003 | Hayes | H04L 9/40 709/211 |
| 2003/0229899 A1 | 12/2003 | Thompson et al. | |
| 2004/0001021 A1 | 1/2004 | Choo et al. | |
| 2004/0034697 A1 | 2/2004 | Fairhurst et al. | |
| 2004/0040041 A1 | 2/2004 | Crawford | |
| 2004/0073944 A1 | 4/2004 | Booth | |
| 2004/0078829 A1 | 4/2004 | Patel et al. | |
| 2004/0139177 A1 * | 7/2004 | Yook | H04L 12/2814 709/220 |
| 2004/0143836 A1 | 7/2004 | McCormack et al. | |
| 2004/0181811 A1 | 9/2004 | Rakib | |
| 2004/0230754 A1 | 11/2004 | Gumm et al. | |
| 2005/0027715 A1 | 2/2005 | Casey et al. | |
| 2006/0168159 A1 | 7/2006 | Weisman et al. | |
| 2006/0184661 A1 | 8/2006 | Weisman et al. | |
| 2006/0188004 A1 | 8/2006 | Kizu et al. | |
| 2006/0268676 A1 | 11/2006 | Gore et al. | |
| 2007/0022459 A1 | 1/2007 | Gaebel et al. | |
| 2007/0094691 A1 | 4/2007 | Gazdzinski | |
| 2007/0237159 A1 | 10/2007 | Yamada et al. | |
| 2008/0010506 A1 * | 1/2008 | Tabei | G06F 11/0793 714/E11.023 |
| 2008/0097913 A1 | 4/2008 | Dicks et al. | |
| 2008/0126540 A1 | 5/2008 | Zeng et al. | |
| 2008/0235746 A1 | 9/2008 | Peters et al. | |
| 2008/0313345 A1 | 12/2008 | Bernardin et al. | |
| 2009/0163140 A1 * | 6/2009 | Packham | H04L 67/02 455/557 |
| 2009/0307307 A1 | 12/2009 | Igarashi | |
| 2009/0323516 A1 | 12/2009 | Bhagwan et al. | |
| 2010/0070630 A1 | 3/2010 | Ding | |
| 2010/0094956 A1 | 4/2010 | Zuckerman et al. | |
| 2010/0165947 A1 | 7/2010 | Taniuchi et al. | |
| 2010/0202450 A1 * | 8/2010 | Ansari | H04L 12/66 370/389 |
| 2010/0219976 A1 | 9/2010 | Park et al. | |
| 2010/0262722 A1 | 10/2010 | Vauthier et al. | |
| 2011/0014924 A1 | 1/2011 | Hwang et al. | |
| 2011/0191321 A1 | 8/2011 | Gade et al. | |
| 2011/0210849 A1 * | 9/2011 | Howard | H04W 4/02 455/458 |
| 2011/0270751 A1 | 11/2011 | Csinger et al. | |
| 2011/0314462 A1 | 12/2011 | Clark et al. | |
| 2012/0079507 A1 * | 3/2012 | Agarwal | H04L 12/2821 719/321 |
| 2012/0210379 A1 | 8/2012 | McCoy et al. | |
| 2013/0007413 A1 | 1/2013 | Thomson et al. | |
| 2013/0109323 A1 | 5/2013 | Ruutu et al. | |
| 2013/0136089 A1 | 5/2013 | Gillett et al. | |
| 2013/0174223 A1 | 7/2013 | Dykeman et al. | |
| 2013/0191495 A1 * | 7/2013 | Almstrand | G06F 8/64 709/217 |
| 2013/0219010 A1 | 8/2013 | Mahendran et al. | |
| 2013/0238426 A1 | 9/2013 | Mukhopadhyay et al. | |
| 2013/0258997 A1 | 10/2013 | Chen | |
| 2014/0035182 A1 | 2/2014 | Boyer et al. | |
| 2014/0106672 A1 | 4/2014 | Jeon et al. | |
| 2014/0139422 A1 | 5/2014 | Mistry et al. | |
| 2014/0194068 A1 | 7/2014 | Coppage et al. | |
| 2014/0215457 A1 * | 7/2014 | Gava | H04L 67/1095 709/201 |
| 2015/0026740 A1 | 1/2015 | Poder et al. | |
| 2015/0052512 A1 | 2/2015 | Kostadinov et al. | |
| 2015/0055623 A1 | 2/2015 | Li et al. | |
| 2015/0058861 A1 | 2/2015 | Zheng et al. | |
| 2015/0120000 A1 * | 4/2015 | Coffey | H04W 12/50 315/86 |
| 2015/0134970 A1 | 5/2015 | Jang et al. | |
| 2015/0156095 A1 | 6/2015 | Lu | |
| 2015/0235670 A1 | 8/2015 | Kim et al. | |
| 2015/0327313 A1 | 11/2015 | Kim et al. | |
| 2015/0373741 A1 | 12/2015 | Yerramalli et al. | |
| 2016/0073259 A1 | 3/2016 | Lee et al. | |
| 2016/0128072 A1 | 5/2016 | Rajagopal et al. | |
| 2016/0174043 A1 * | 6/2016 | Ko | H04W 4/026 455/456.1 |

(56) References Cited

U.S. PATENT DOCUMENTS

| | | | |
|---|---|---|---|
| 2016/0174268 A1* | 6/2016 | Hu | H04L 43/18 |
| | | | 709/227 |
| 2016/0212031 A1 | 7/2016 | Jain et al. | |
| 2017/0019144 A1 | 1/2017 | Malach | |
| 2017/0026157 A1* | 1/2017 | Bugenhagen | H04W 4/70 |
| 2017/0104644 A1 | 4/2017 | Ladd et al. | |
| 2017/0140286 A1* | 5/2017 | Basu | G06N 20/00 |
| 2017/0187966 A1 | 6/2017 | Oetting | |
| 2017/0257750 A1 | 9/2017 | Gunasekara et al. | |
| 2018/0034524 A1 | 2/2018 | Pao et al. | |
| 2018/0146058 A1 | 5/2018 | Somayazulu et al. | |
| 2018/0181119 A1 | 6/2018 | Lee et al. | |
| 2018/0199214 A1 | 7/2018 | Shen | |
| 2018/0234403 A1 | 8/2018 | Casella et al. | |
| 2018/0235007 A1 | 8/2018 | Gou et al. | |
| 2018/0239425 A1 | 8/2018 | Jang | |
| 2018/0255576 A1 | 9/2018 | Bhorkar et al. | |
| 2018/0279212 A1 | 9/2018 | Malik et al. | |
| 2018/0300551 A1 | 10/2018 | Luccin et al. | |
| 2018/0352386 A1 | 12/2018 | Gunasekara et al. | |
| 2019/0104033 A1* | 4/2019 | Carey | H04L 67/51 |
| 2019/0104551 A1 | 4/2019 | Deenoo et al. | |
| 2019/0150182 A1 | 5/2019 | Koorapaty et al. | |
| 2019/0182895 A1 | 6/2019 | Di Girolamo et al. | |
| 2019/0230613 A1 | 7/2019 | Kim et al. | |
| 2019/0239190 A1 | 8/2019 | Patel et al. | |
| 2019/0289470 A1 | 9/2019 | Vaidya et al. | |
| 2019/0293748 A1 | 9/2019 | Gulati et al. | |
| 2019/0319814 A1 | 10/2019 | Das | |
| 2019/0319858 A1 | 10/2019 | Das et al. | |
| 2019/0320250 A1 | 10/2019 | Hoole et al. | |
| 2019/0320322 A1 | 10/2019 | Jayawardene et al. | |
| 2019/0320490 A1 | 10/2019 | Liu et al. | |
| 2019/0320494 A1 | 10/2019 | Jayawardene et al. | |
| 2019/0349848 A1 | 11/2019 | Bali | |
| 2019/0364492 A1 | 11/2019 | Azizi et al. | |
| 2019/0394790 A1 | 12/2019 | Damnjanovic et al. | |
| 2020/0015147 A1 | 1/2020 | Malkamaki et al. | |
| 2020/0053545 A1 | 2/2020 | Wong et al. | |
| 2020/0065085 A1* | 2/2020 | Talbert | G06F 8/65 |
| 2020/0076708 A1* | 3/2020 | Kloberdans | H04L 61/5061 |
| 2020/0106678 A1* | 4/2020 | Grill | H04L 41/0661 |
| 2020/0126551 A1* | 4/2020 | Xiong | G06F 3/167 |
| 2020/0178237 A1 | 6/2020 | Kakinada et al. | |
| 2020/0186378 A1* | 6/2020 | Six | H04L 12/2803 |
| 2020/0187150 A1 | 6/2020 | Eisner | |
| 2020/0228993 A1 | 7/2020 | Gunasekara | |
| 2020/0252933 A1 | 8/2020 | Hmimy et al. | |
| 2020/0259896 A1 | 8/2020 | Sachs et al. | |
| 2020/0275457 A1 | 8/2020 | Hmimy | |
| 2020/0281008 A1 | 9/2020 | Aboul-Magd et al. | |
| 2020/0344515 A1 | 10/2020 | Wong et al. | |
| 2020/0351989 A1 | 11/2020 | Ahmet et al. | |
| 2020/0412565 A1 | 12/2020 | Sanders et al. | |
| 2021/0026711 A1* | 1/2021 | Ovadia | H04L 69/16 |
| 2021/0076424 A1 | 3/2021 | Mukherjee et al. | |
| 2021/0084117 A1* | 3/2021 | Ovadia | H04L 41/0806 |
| 2021/0120315 A1 | 4/2021 | Makinen et al. | |
| 2021/0136838 A1 | 5/2021 | Khalid et al. | |
| 2021/0219143 A1 | 7/2021 | Khalid et al. | |
| 2021/0219303 A1 | 7/2021 | Khalid et al. | |
| 2021/0274333 A1 | 9/2021 | Petersen | |
| 2021/0297979 A1 | 9/2021 | Hmimy et al. | |
| 2022/0321675 A1* | 10/2022 | Ovadia | H04L 41/0806 |

FOREIGN PATENT DOCUMENTS

| | | | |
|---|---|---|---|
| CA | 3097140 A1 | 10/2019 | |
| CN | 105071860 A | 11/2015 | |
| CN | 111989900 A | 11/2020 | |
| EP | 1046259 B1 | 3/2005 | |
| EP | 1769634 A2 | 4/2007 | |
| EP | 3782341 A1 | 2/2021 | |
| JP | 2011254495 A | 12/2011 | |
| JP | 2017118483 A | 6/2017 | |
| KR | 20160097917 A | 8/2016 | |
| WO | WO-2004045125 A2 | 5/2004 | |
| WO | WO-2005052766 A2 | 6/2005 | |
| WO | WO-2019204165 A1 | 10/2019 | |
| WO | WO-2021050957 A1 | 3/2021 | |

OTHER PUBLICATIONS

Wi-Fi Direct, "Wi-Fi Peer-to-Peer (P2P) Specification," Wi-Fi Alliance, Version 1.5, 2014, 183 pages.

Maamoun K. M. et al., "A Survey and a Novel Scheme for RoF-PON as FTTx Wireless Services," 2009 6th InternationalSymposium on High Capacity Optical Networks and Enabling Technologies(HONET), IEEE, 2009, pp. 246-253.

* cited by examiner

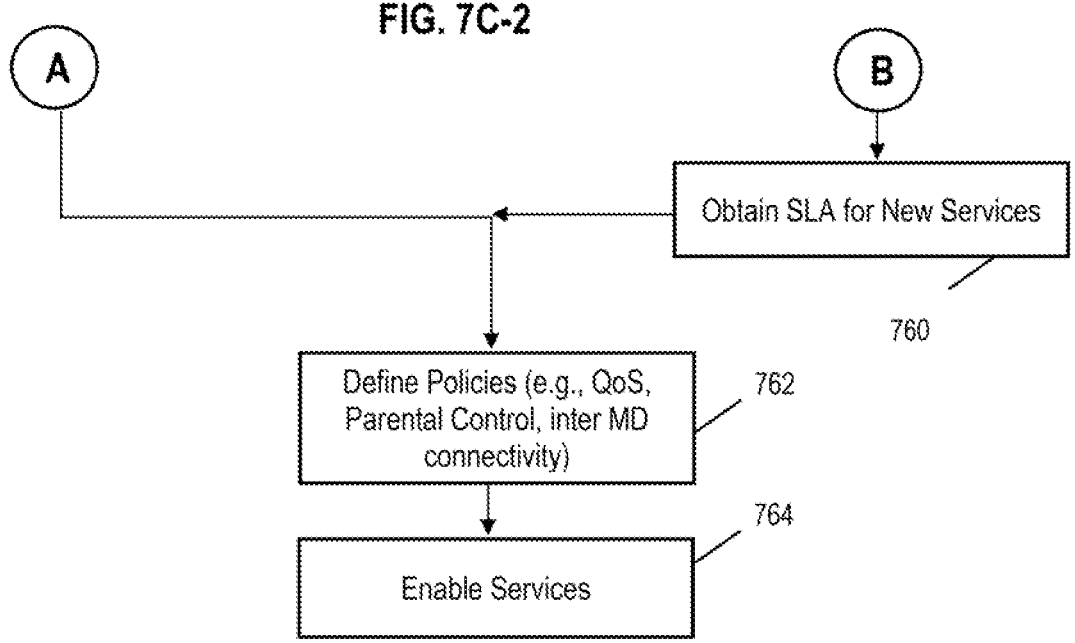

METHODS AND APPARATUS FOR SUPPORTING PLATFORM AND APPLICATION DEVELOPMENT AND OPERATION

PRIORITY AND RELATED APPLICATIONS

This application is a divisional of, and claims priority to, co-owned U.S. patent application Ser. No. 16/573,770 of the same title filed on Sep. 17, 2019, and issuing as U.S. Pat. No. 11,368,552 on Jun. 21, 2022, which is incorporated herein by reference in its entirety.

The subject matter of this application is generally related to that described in co-owned and co-pending U.S. patent application Ser. No. 16/523,847 filed Jul. 26, 2019 and entitled "METHODS AND APPARATUS FOR MULTI-PROCESSOR DEVICE SOFTWARE DEVELOPMENT AND OPERATION," which is incorporated herein by reference in its entirety. It is also related to co-owned and co-pending U.S. patent application Ser. No. 16/115,976 filed Aug. 29, 2018 and entitled "SYSTEM ARCHITECTURE AND METHODS FOR CONTROLLING AND MANAGING NETWORKING DEVICES AND EXPEDITING NEW SERVICE DELIVERY IN A SUBSCRIBER'S HOME NETWORK USING MICRO-DOMAINS," which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present disclosure relates generally to the field of software architectures used on electronic devices such as modems, wireless access nodes, routers and gateways used within data networks, and specifically in one exemplary aspect to the control and maintenance of multiple platforms and devices and related services within such electronic devices.

2. Description of Related Technology

Electronic devices are ubiquitous within modern data networks and content distribution networks; e.g., those operated by an MSO (multiple systems operator), ISP (Internet service provider) or MNO (mobile network operator). Typical devices used in such networks (such as e.g., at a user or subscriber premises) include modems, routers, gateways, wireless access points, and mobile devices. Typically, a network service provider (e.g., MSO) will provide a user with a modem (e.g., cable or DOCSIS-compliant modem) for use at the premises. These modems interface with the host network (e.g., the MSO's RF-based HFC network) for backhaul and delivery of data/content, and provide connectivity for other devices at the premises (e.g., to televisions, computers, WLAN APs, networking equipment, and user mobile devices, depending on configuration).

FIG. 1 illustrates a typical prior art premises configuration 100, including a number of heterogeneous types of premises devices or EUDs (end user devices) 108, 109, 110, 117. These devices may be associated with different service provider software domains 102, 104, or unassociated with any service provider at all (e.g., a premises IoT device that merely uses the service provider infrastructure for Internet access "OTT" to effectuate its own software domain 105). The various devices may have various levels of interconnection with one another; e.g., a premises gateway may interconnect with both a service provider domain 102 and one or more other premises devices (e.g., smart TVs, mobile devices, etc.) such as via LAN or WLAN or PAN networks within the premises (whether fixed or ad hoc in nature), and as noted the IoT or other such device may access network functionality via one of the service providers).

Multiple of the devices of FIG. 1 may be associated with a common service provider 102, while some may be associated with a different service provider 104. Even within the same service provider domain, heterogeneous devices and applications may be used, such as for provision of different types of services such as digital television, broadband, digital telephone, etc. For instance, a cable MSO may provide its subscribers or customers with (i) a DOCSIS cable modem; (ii) a Wi-Fi enabled gateway/router; (iii) a DSTB; and/or (iv) wireless infrastructure, such as CBRS FWA equipment or a 3GPP-compatible small cell, each designed and manufactured effectively in its own "silo" without much if any consideration regarding common utilization buy a network user or subscriber within their premises.

As shown in FIG. 1, the various application programs 112, 114, 116, 118 or other software components of the devices may originate from different sources, and be heterogeneous in configuration as well. For instance, the premises devices 108, 109 shown in FIG. 1 that are associated with the first service provider domain 102 (e.g., that of the aforementioned cable MSO) may each utilize different applications or "apps" or other software/firmware components for control or other functions. The apps are each written for the specific hardware environment of the respective device (e.g. one may be a Linux-based device such as an Android OS device, one an iOS-based device, one a Windows-based device, an RTOS-based OS such as WindRiver or Amazon FreeRTOS on an IoT or embedded device, and so forth). Hence, even though the MSO may provide all of the apps for its devices, each app is in effect customized for its target platform; i.e., is written by the service provider or a third-party software developer for the particular target hardware environment and OS, and cannot be used generically across different types of devices.

FIG. 1A shows a typical prior art premises gateway device 109, including application and host (CPU) processors, memory, and network/wireless interfaces. Depending on the device type (e.g., gateway, DSTB, DOCSIS modem, CBRS FWA) or configuration, various MSO apps 140 or stored on the device as code and operative to execute of the host CPU (or even the application processor in some cases), such as for network or air interface management, EPG functions, VoIP, Internet browser, "intelligent/virtual assistant" (e.g., akin to Amazon Alexa), media players (e.g., for decoding media streams encoded with a particular codec), and the like. Additionally, within NVM (nonvolatile memory such as ROM), one or more firmware images 136 are present, such as to support operation of the modem(s) or other functions supporting services provided by the network operator via the device.

As can be appreciated, the software/firmware model of the device 109 of FIG. 1A is somewhat monolithic or static; i.e., apps and firmware are each developed specifically for the hardware environment of the particular device (which may not be standardized either between different installations of the same service provider, or across different service providers), and often come pre-loaded on the device.

Additionally, even if a proposed an app or other component to be added to the device 109 after manufacturing is compatible with a given premises device, it may require a firmware upgrade or change in order to properly execute on the target platform, or driver installation to support some of the functions called by the app.

Similarly, across different domains 102, 104, the different service providers may each use heterogeneous hardware, operating systems, etc. in support of their particular services, thereby introducing additional diversity in cases where the user leverages services from multiple service providers (e.g., a cable MSO, a cellular service provider, and an OTT or Internet "cloud" service, etc.).

Moreover, non-MSO devices within a premises may receive OTA (over the air) or Internet-based updates from e.g., the device manufacturer, such as for firmware or new versions of already installed applications of the relevant device (e.g., from a manufacturers website) via the Internet 106.

Accordingly, a typical user/subscriber at a "connected" premises may be confronted with a large variety of different OS, firmware and app choices and compatibility requirements, which depending on the level of diversity and complexity of devices, can be overwhelming for the typical user to manage, and can result in user frustration and loss of user experience. It can also trigger a disproportionate number of calls or interactions with technical support personnel for e.g., the MSO or other service provider, device manufacturer, or third-party app supplier or developer. Additionally, applications management within multiple devices and platforms such as shown in FIG. 1 is often complicated by the fact that any update or management of one feature may impact the operation of other features within the platform or device (or even other devices in communication with the device being updated/managed). Complex interactions may exist, and failure or improper operation of one function within one device (or part of a device) may disable or adversely affect other functions.

While so-called "app stores" or portals such as Google Play are accessible to users wishing to identify and download apps for their devices, such app stores are generally constrained to a given underlying technology and OS (e.g., Android only), and such portals have no knowledge of the indigenous services/devices of a user accessing the portal. For example, a user wishing to download an app for their Android tablet has no mechanism to identify other devices/services within their premises that the tablet may be used with (and hence ostensibly obtain compatible apps or other components for those devices as well).

Accordingly, there is a need for improved apparatus and methods for selection, installation, storage and execution of an applications or other components within a premises having multiple different devices (and types of devices). Such improved apparatus and methods could ideally provide a unified portal or interface for all premises devices; e.g. cable modems, DSTBs, WLAN APs, gateways, FWA apparatus, small cells, and other devices commonly deployed by network operators or service providers as well as consumer devices such as tablets, smartphones, smart TVs, "kiosks" such as Amazon Alexa, IOT devices, and hubs, and gaming devices also used within the premises.

Moreover, these improved apparatus and methods would, inter alia, significantly reduce the time and effort associated with installation, storage testing, launching, and maintenance of such devices, including allowing for installation of (or changes to) individual apps or platforms with incipient or deployed devices directly by the network operator/service provider, thereby eliminating the client needs to understand and maintain the multiple platforms.

SUMMARY OF THE INVENTION

The present disclosure addresses the foregoing needs by disclosing, inter alia, apparatus and methods for software component selection, installation, and utilization within a premises.

In a first aspect of the disclosure, a method for onboarding a software component within a premises network using a premises device, the premises device comprising a portal process operative to execute on a first processor of the premises device. In one embodiment, the method includes: receiving a user input via a user interface of the portal process as to a target software object desired; using the user input to cause evaluation of the target software object for at least one aspect of compatibility with a plurality of computerized devices associated with the premises network; and causing presentation of data relating to the results of the evaluation to the user via the user interface so as to enable the user to cause installation of the software object on at least one of the plurality of computerized devices.

In one variant, the portal process includes a hardware compatibility determination process and a firmware compatibility determination process, and the evaluation includes using the hardware compatibility determination process to evaluate a compatibility with the hardware of at least one of the plurality of computerized devices, and using the firmware compatibility determination process to evaluate a compatibility with the firmware of the at least one of the plurality of computerized devices.

In another variant, the portal process includes a process configured to associate the target software object with one or more logical domains specified by the user via the user interface.

In a further variant, the method further includes installing the software object on the at least one computerized device from the premises device.

In another variant, the premises device includes a gateway in data communication with a managed content distribution network, and the method further includes using the portal process cause display via the user interface of a plurality of software objects associated with a service provided by the managed content distribution network, the plurality of software objects known to be compatible with at least one of the plurality of computerized devices.

In one implementation, the method further includes using the gateway in data communication with a managed content distribution network to query a network process of the managed content distribution network to obtain at least data relating to the plurality of computerized devices, and then using the portal process to conduct said evaluation of the target software object locally at the gateway.

In another implementation, the method further includes using the gateway in data communication with a managed content distribution network to: query at least one of the plurality of computerized devices as to one capability or configuration parameter thereof; receive data in response to the query relating to the at least one capability or configuration parameter; and query a network process of the managed content distribution network using at least the received data to cause the network process to evaluate the target software object for compatibility with the queried at least one of the plurality of computerized devices.

In another aspect, a software architecture for use in a computerized premises device of a managed content distribution network, the software architecture enabling compatibility between a plurality of application software objects and a plurality of computerized devices associated with the premises device, the plurality of computerized devices having heterogeneous hardware and firmware configurations. In one embodiment, the architecture includes: an open-source operating system (OS) having a plurality of components operative to execute on a first processor; and a container engine software layer having a plurality of components operative to execute on the first processor, the container engine software layer being communicative with the OS and configured to support the plurality of containerized application software objects; wherein the open-sourced OS and the container engine are cooperative to enable communication between each of the plurality of computerized devices and the premises device using software on each of the plurality of computerized devices which is compatible with at least one of the containerized application software objects and the open-source OS and which is abstracted above its respective computerized device hardware and firmware configuration.

In another aspect, computerized apparatus is disclosed. In one embodiment, the apparatus includes: a first processor apparatus; a data interface in data communication with the processor apparatus, the data interface configured for data communication with an end user device (EUD); an open-source operating system (OS) configured to execute on the first processor apparatus; a first portal process integrated in a software stack of the first processor apparatus and configured to interoperate with the open-source OS, the portal process further configured to determine a compatibility of a plurality of application software with at least one of the computerized apparatus or the EUD.

In one variant, the computerized apparatus includes gateway apparatus for use in a managed content distribution network, and the gateway apparatus further includes a network interface apparatus configured to interface with a server process of the managed content distribution network in order to determine said compatibility.

In another variant, the first portal process includes a containerized application software engine, the engine configured to manage one or more containerized applications utilized with the computerized apparatus.

In another variant, the computerized apparatus is further configured to cause installation of one or more of the plurality of application software on the EUD.

In another aspect of the invention, a consumer device is disclosed. In one embodiment, the consumer device includes a Smart TV or gaming device. In one variant, the consumer device is configured to interface with a premises gateway to enable software on-boarding for the consumer device via the portal.

In another aspect of disclosure, network apparatus for use within a first network is disclosed. In one embodiment, the network apparatus is configured to generate messaging (e.g., command and control, informational such as device configuration, or other) to one or more attached or associated devices, and includes: digital processor apparatus; network interface apparatus in data communication with the digital processor apparatus and configured to transact data with the one or more attached devices; and a storage apparatus in data communication with the digital processor apparatus and comprising at least one computer program.

In one variant, the messaging is configured to cause the attached or associated devices to respond with configuration information, such as API calls to a process or an embedded device within the attached or associated device to return certain types of data from an applications processor.

In another aspect, a managed network architecture is disclosed. In one embodiment, the managed architecture includes a portal manager server and client device and subscriber databases, as well as a software database, which support compatibility determination for software with deployed premises devices, as well as new service deployment.

In another aspect of disclosure, computer readable apparatus is disclosed. In one embodiment, the apparatus includes a storage medium configured to store one or more computer program. In another embodiment, the apparatus includes a program memory or HDD or SDD on a computerized server device, such as an MSO gateway apparatus used in a user or subscriber premises.

In another aspect, a software architecture for use on within a managed content distribution network is disclosed.

In a further aspect, a premises network architecture comprising a device configured to act as a service provider portal is disclosed.

These and other aspects shall become apparent when considered in light of the disclosure provided herein.

BRIEF DESCRIPTION OF THE DRAWINGS

FIGS. 7C-1 and 7C-2 are a logic flow diagram illustrating an exemplary implementation of the generalized method of FIG. 7, including micro-domain assignment.

Figure 1:
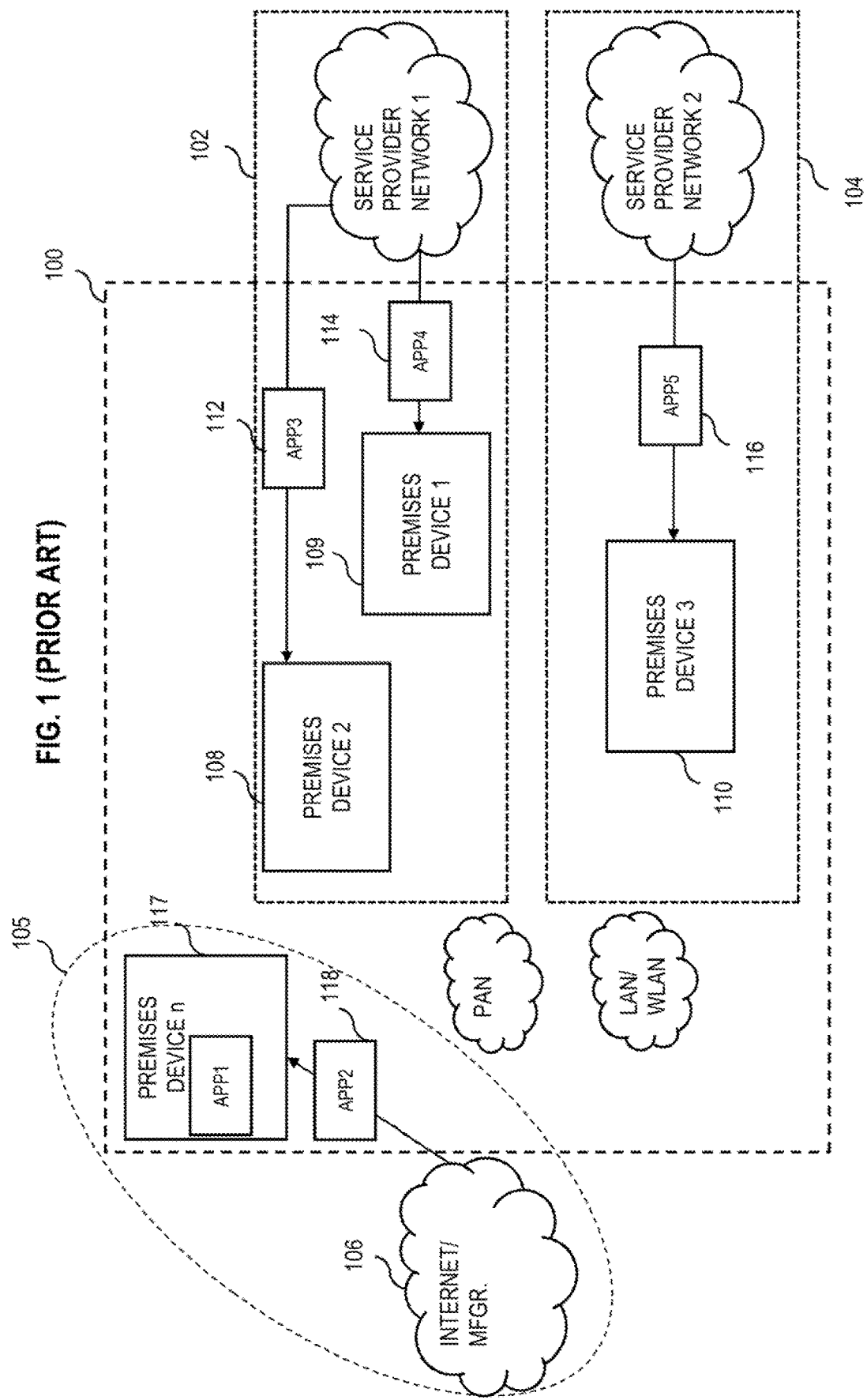
FIG. 1 is a block diagram illustrating one exemplary configuration of a prior art multi-device user or subscriber premises served by multiple service providers.

All figures © Copyright 2019 Charter Communications Operating, LLC. All rights reserved.

DETAILED DESCRIPTION OF THE INVENTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "browser" refers to any computer program, application or module which provides network access capability including, without limitation, Internet browsers adapted for accessing one or more websites or URLs over the Internet, as well as any "user agent" including those adapted for visual, aural, or tactile communications.

As used herein, the term "CBRS" refers without limitation to the CBRS architecture and protocols described in "Signaling Protocols and Procedures for Citizens Broadband Radio Service (CBRS): Spectrum Access System (SAS)—Citizens Broadband Radio Service Device (CBSD) Interface Technical Specification"—Document WINNF-TS-0016, Version V1.2.1. 3, Jan. 2018, incorporated herein by reference in its entirety, and any related documents or subsequent versions thereof.

As used herein, the terms "CPE (customer premises equipment)," "client device" or "user device," "EUD (end user device)" or "UE (user equipment)" include, but are not limited to, set-top boxes (e.g., DSTBs), gateways, routers, modems, personal computers (PCs), and minicomputers, whether desktop, laptop, or otherwise, and mobile devices such as handheld computers, PDAs, personal media devices (PMDs), tablets, "phablets", smartphones, Smart TVs, gaming devices, and vehicle infotainment systems or portions thereof.

As used herein, the term "codec" refers to a video, audio, or other data coding and/or decoding algorithm, process or apparatus including, without limitation, those of the MPEG (e.g., MPEG-1, MPEG-2, MPEG-4/H.264, HEVC/H.265, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Ruby, Python, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "memory" includes any type of integrated circuit or other storage device adapted for storing digital data including, without limitation, ROM, PROM, EEPROM, DRAM, SDRAM, DDR2/3/4/5/6 SDRAM, EDO/FPMS, RLDRAM, SRAM, "flash" memory (e.g., NAND/NOR), 3D memory, XPoint, spin-transfer/torque memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 0/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "QAM (quadrature amplitude modulation)" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" or UI refers to any human-system interface adapted to permit one- or multi-way interactivity between one or more users and the system. User interfaces include, without limitation, graphical UI, speech or audio UI, tactile UI, and even virtual UI (e.g., virtual or augmented reality).

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, analog cellular, CDPD, satellite systems, millimeter wave or microwave systems, acoustic, and infrared (i.e., IrDA).

Overview

In one exemplary aspect, the present disclosure provides apparatus and methods for enhanced installation, storage, configuration/re-configuration and execution of software applications within a premises operating environment. In one embodiment described herein, an open source operating system (e.g., OpenWrt-based Architecture) is used on a premises device such as a unified gateway/router to create, inter alia, a centralized platform to act as a self-service application store or entry point for all devices that connect to the premises device(s). These other devices may be network operator-supplied, consumer/aftermarket devices, IoT devices, or yet other types of devices. The exemplary portal functionality supports both MSO-based and third-party apps for the various devices as applicable.

In one variant, the captive portal is operated and maintained by a service provider (e.g., MSO), and is extensible as the functionality of the centralized platform expands or changes, and the number and/or types of devices managed by the MSO Portal change. Additionally, where a given app or service desired by the user is incompatible with the current premises device or network configuration, the MSO portal provides the user with various options for resolution, including e.g., (i) upgrading the premises device firmware that it compatible with the desired MSO or third-party app; (ii) access to other similar apps that are compatible with the subscriber's premises device; and (iii) obtaining a substitute or replacement premises device that is compatible with the desired app (such as if no suitable replacement apps are available).

In another embodiment the OpenWrt components or containers are used as a base for developing apps and services.

Through use of the portal, the time, effort and complexity associated with installation, storage testing, launching, feature or service change, and maintenance of the user's premises devices is reduced significantly.

Moreover, the disclosed portal architecture allows for installation of (or changes to) individual apps or services within incipient or deployed devices directly by the network operator/service provider, thereby expediting service "velocity" (including implementation of new features and services) and eliminating the client's need to understand and utilize multiple heterogeneous platforms or sources such as different online app stores.

Detailed Description of Exemplary Embodiments

Exemplary embodiments of the apparatus and methods of the present disclosure are now described in detail. While these exemplary embodiments are described in the context of the aforementioned hybrid fiber coax (HFC) cable system architecture having an multimedia specific operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present disclosure may be readily adapted to other types of environments (e.g., commercial/enterprise, government/military, etc.) as well. Myriad other applications are possible.

Premises Software Architecture

Figure 1A:
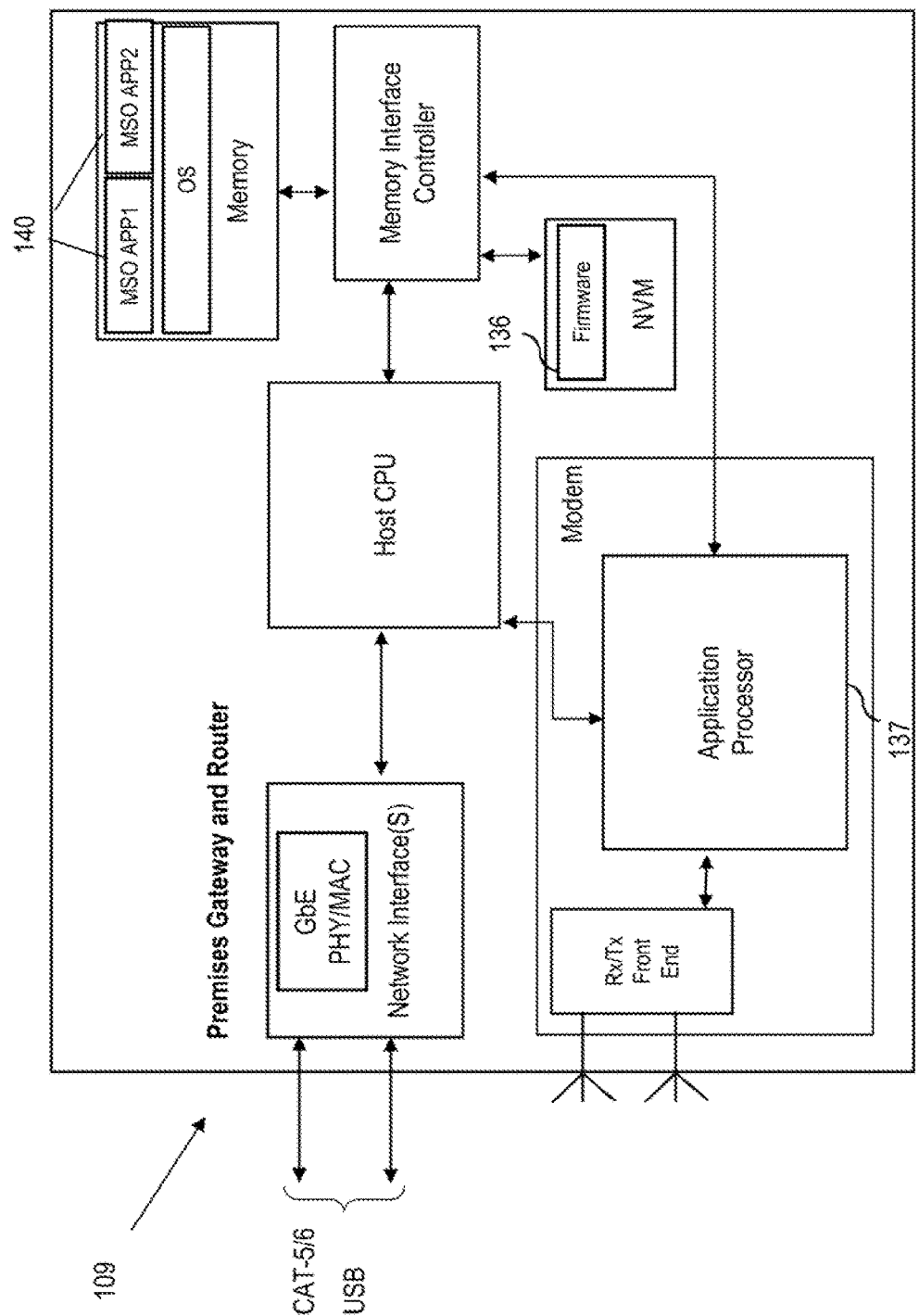
FIG. 1A is a functional block diagram illustrating one exemplary configuration of a prior art premises gateway used within the premises of FIG. 1.
Figure 2:
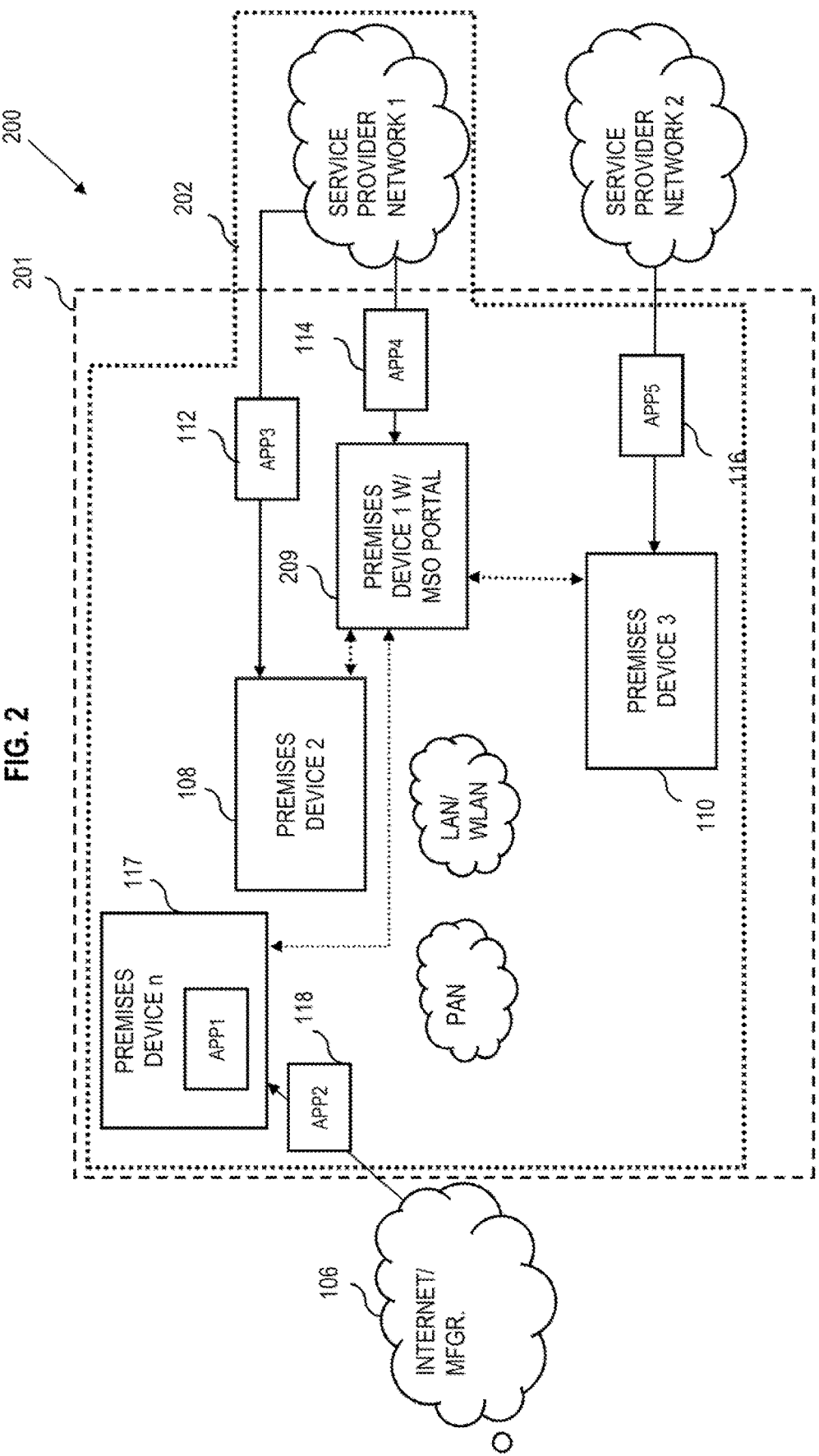
FIG. 2 is a block diagram illustrating one exemplary embodiment of a multi-device user or subscriber premises software architecture according to the disclosure.

Referring now to FIG. 2, one embodiment of a premises software architecture according to the present disclosure is shown and described. In comparison to the prior art approach discussed above with respect to FIGS. 1 and 1A, the architecture 200 of FIG. 2 in effect creates an MSO-managed "super domain" 202 for software and other such components within the user's premises 201 which is enabled by an open-source OS based gateway 209 (described in detail below with respect to FIG. 3) with MSO portal functionality which acts, in conjunction with associated cloud-based entities of the MSO infrastructure (see FIG. 6), to (i) validate firmware compatibility and assign the selected applications to various ones of CPE 108 or EUD 110 within the premises and associated with the user(s) thereof, and (ii) manage logical and/or topological "micro-domains" within the premises 201 so as to enforce user-based or MSO-based policies and services. Advantageously, the portal-enabled gateway 209 also provides effective one-stop shopping and compatibility verification for indigenous MSO apps (e.g., MSO EPG or OTT streaming apps for its subscriber's mobile devices) as well as third-party apps (e.g., a skill or other such functionality for a premises IoT device), thereby alleviating the user of having to locate and utilize multiple different sources for the various apps associated with the heterogeneous CPE and EUD device hardware and firmware environments, check compatibility, resolve cross-platform incompatibility issues, etc.

As further described below with respect to FIG. 3, the exemplary gateway (GW) 209 also integrates two or more previously disparate hardware environments associated with supporting the different premises devices and CPE within a common form factor and under a common open-source OS, also making use of containerized applications. As is known, containerized applications afford several benefits, including to operating environments such as those contemplated herein (e.g., managed service provider networks).

In brief, application containerization is an OS-level virtualization method used to deploy and run distributed applications without the requirement to utilize a virtual machine (VM) for each app. Under VMs, the underlying host device is in effect emulated within each VM, as if each separate application has its own little host device to execute on. As such, the physical resources of the host (CPUs, memory, etc.) can be shared.

In contrast, containerization involves use of multiple isolated applications or services running on a single host and utilizing the same OS kernel. As such, containers consume fewer resources than a comparable deployment on VMs, because the containers share resources without a full operating system supporting each different app.

A container image is a complete set of information to execute within a container; these images are deployed by a container engine (e.g., "Docker") on hosts, and each container operates independently of others on the same host. Application programming interfaces (APIs) are used for inter-service communications, and the container virtualization layer used to scale and distribute load.

Notably, containerization enhances flexibility; for example, if a developer desires a variation from the standard image, it can be created via a container that holds only the new image and its library. Containerization also enhances efficiency for memory, CPU and storage compared to traditional VM and physical application hosting (such as shown in the prior art device of FIG. 1A). Stated differently, without the overhead required by VMs or physical app hosting, it is possible to support many more application containers on the same host device infrastructure.

Portability is yet another benefit; as long as the OS is the same across various instances of the hosts, an application container can run on any host without requiring code changes. Unlike VMs and hypervisors, there are no guest OS environment variables or library dependencies that need to be managed.

Hence, in the exemplary embodiment of the software architecture of FIG. 2, the gateway makes use of containerized apps (e.g., via a Docker container engine or similar) in order to leverage the benefits described above. Specifically, through use of (i) an open-sourced OS which supports a broad range of third-party developers and developed apps, and (ii) use of a containerized software architecture with its great portability and flexibility (including e.g., MSO app development, testing, and deployment), service "velocity" and ubiquity is greatly enhanced (in simple terms, new apps can be more rapidly developed and deployed, and the ability for such new apps to run on a broad range of hardware environments is greatly improved over prior art approaches).

The foregoing benefits are particularly striking within the MSO/managed network context, since MSOs typically: (i) deploy mixes of CPE, such as various different variants or manufacturers of gateway, DSTB, CM, etc.; (ii) operate their equipment in conjunction with other premises devices such as Smart TVs, tablets, smartphones, gaming devices, and IoT devices/hubs/proxies; (iii) provided unified or bundled services, such as broadband, VoIP and WLAN, and use common infrastructure such as HFC networks, unlicensed wireless (e.g., CBRS or NR-U based backhaul), etc.; and (iv) have large user/subscriber bases which are consumer/entertainment based (as opposed to e.g., enterprises which may have a much narrow focus or service needs).

Hence, the MSO-controlled "portal" approach for software validation and compatibility checks gives the MSO an opportunity to not only more seamlessly deploy new services or products, but also gives the user the enhanced experience of not having to manage the ever-increasing complexity of their premises topology and hardware environment. Moreover, traditionally separate or standalone devices such as IoT hubs or proxies can be eliminated (see e.g., FIG. 3, wherein the IoT interface in conjunction with the open OS/containerization approach allows for direct communication and management of premises IoT devices using potentially disparate protocols without the need for a separate hub/proxy or "translator" device).

It will be noted that in the architecture 200 of FIG. 2, the various service provider support and infrastructure is still maintained; i.e., a user's cellular phone may still be supported by e.g., a 3GPP-based RAN and supporting infrastructure to make use of licensed spectrum, or a third-party shopping website such as Amazon.com used in conjunction with an Alexa-based IoT premises kiosk (e.g., Echo device) that runs OTT on the MSO broadband service. Rather, it is the software and firmware environments which are being unified and made singly accessible via the open-OS/containerization approaches described herein. As a simple example, an Amazon Alexa "skill" may still be sourced from Amazon or its designated cloud agent, but its access and compatibility and cross-platform connectivity are being controlled via the MSO portal and associated infrastructure.

Exemplary Portal-Enabled Gateway Device

Figure 3:
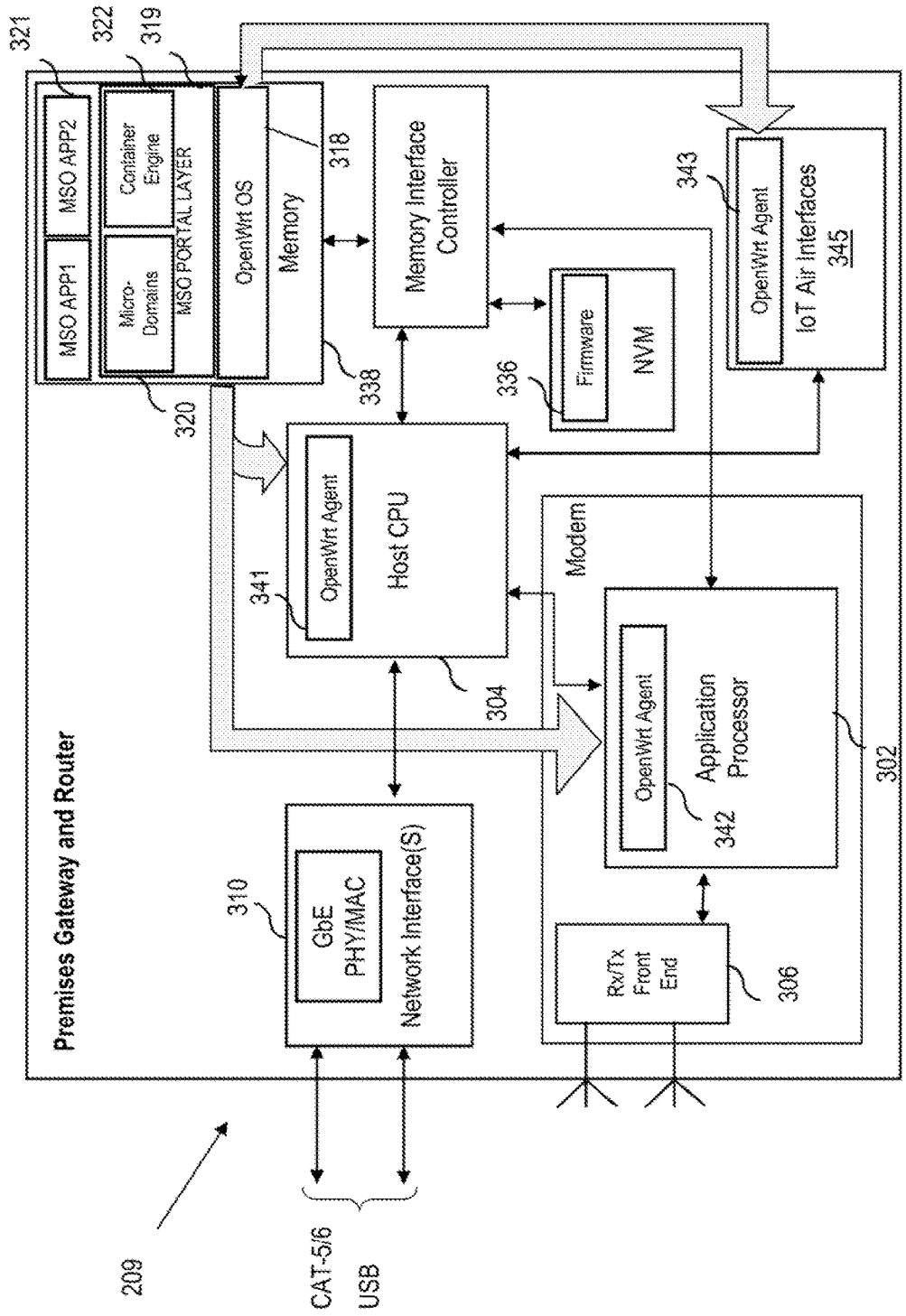
FIG. 3 is a functional block diagram illustrating an exemplary embodiment of a portal-enabled multi-processor premises gateway device according to the present disclosure

Referring now to FIG. 3, one embodiment of an enhanced gateway device 300 according to the present disclosure is described. As shown in FIG. 3, the exemplary residential and SMB (Small-Medium Business) home gateway/router device 300 includes an RF baseband SoC 302 with RISC processor 302 (e.g., an ARM-based solution such as an ARM7 or ARM8 core) as part of a baseband SoC including the PHY and MAC stacks for a Gateway/Router, WLAN RF front end interface 306, a host processor (e.g., multi-core CPU such as an Intel Atom) 304, a plurality of back-end network interfaces 310, memory (e.g., DDR DRAM with memory controller) 338, SRAM (or other NVM), bus controller/hub (such as PCIe-based), plurality of wireless air interfaces 346 (e.g., BLE, IEEE Std. 802.15.4, etc.) and supporting hardware/stacks. A VoIP module/stack (or other voice functionality for the gateway) 209 may also be utilized as shown, such as one utilizing RTCP/RTP and/or SIP protocols of the type known in the art executing on the application processor 302 or the host CPU 304. It will be appreciated that the illustrated architecture is merely exemplary of a number of devices which may be used consistent with the present disclosure.

As shown, the two processor SoCs 304, 302 and the IoT interface each includes a software agent 341, 342, 343 respectively to enable new functions including, inter alia: (i) inter-processor/inter-process communication, (ii) remote access of the stack(s) including that of the baseband SoC modem 201 and IoT interface, such as for testing or configuration changes; and (iii) output of information from e.g., the Host CPU 204. Exemplary configurations of these agents 341, 342, 343 described in co-owned U.S. patent application Ser. No. 16/523,847 filed Jul. 26, 2019, entitled "METHODS AND APPARATUS FOR MULTI-PROCESSOR DEVICE SOFTWARE DEVELOPMENT AND OPERATION," and issued as U.S. Pat. No. 11,182,222 on Nov. 23, 2021, which is incorporated herein by reference in its entirety.

As shown, the host CPU 304 is also configured to execute the OpenWrt OS 318 as well as the components of the MSO Portal layer 319, including a container engine 322, a microdomains engine 320, and a plurality of (e.g., containerized) MSO apps 321 as well as third-party apps (not shown).

Figure 3A:
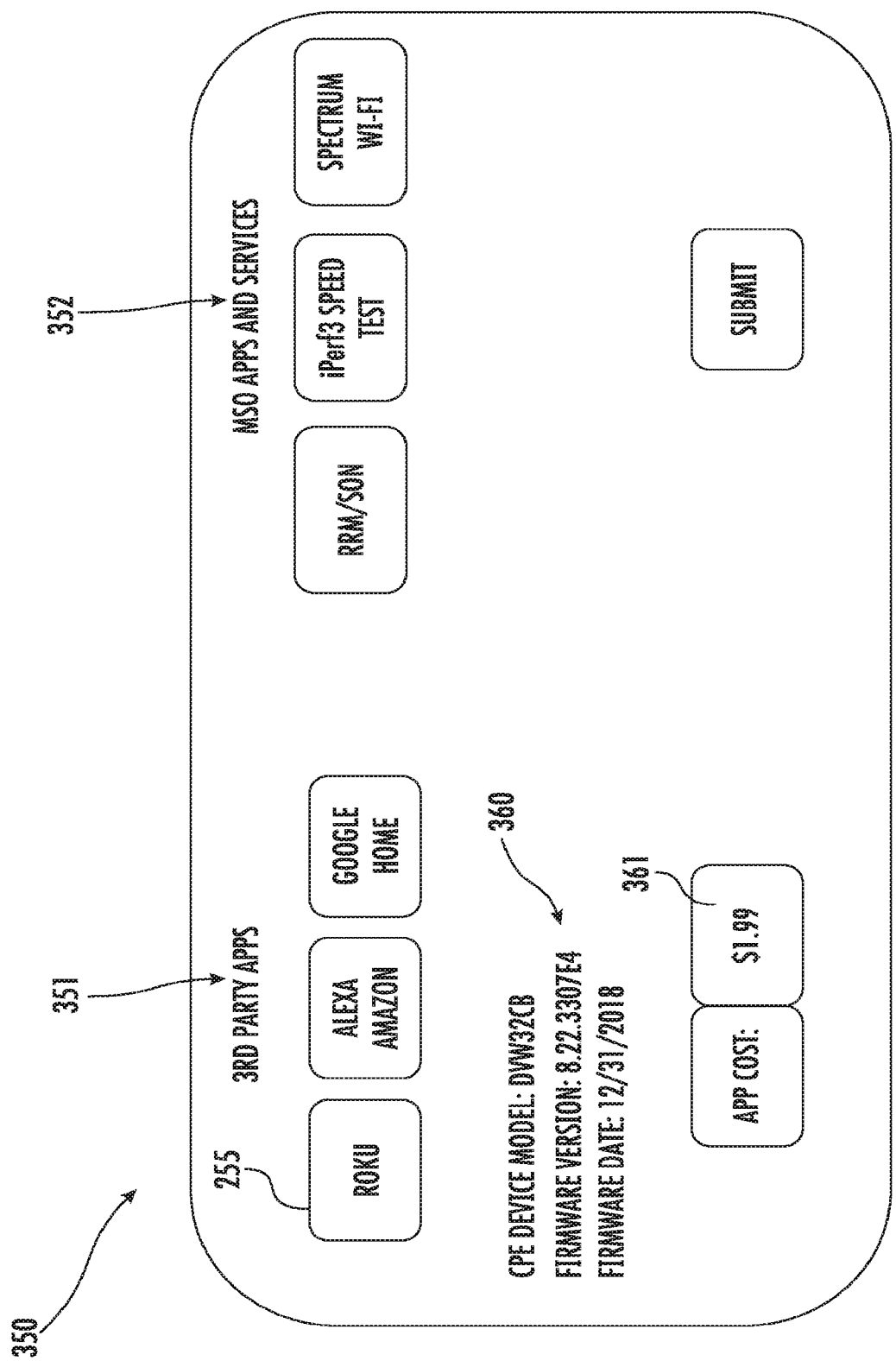
FIG. 3A is a graphical illustration of an exemplary user interface (UI) used with the MSO portal functions according to the present disclosure.

FIG. 3A illustrates an exemplary implementation of an MSO Portal user interface (UI) 350 generated by the software stack of the home gateway device (e.g., on a users' display device such as a connected Smart TV or tablet). In this implementation, both the third-party apps 351 used on e.g., EUD devices (e.g. Amazon Echo and medical IoT devices) and MSO developed apps and services 352 are shown (e.g., MSO-developed apps such as iPerf Speed Test, RRM/SON). Hence, the UI 350 integrates MSO and third-party apps at one virtual location.

It will be appreciated that while various embodiments described herein refer to a "captive portal" (e.g., a web page or other interface that the user of a network is obliged to view and interact with before access to one or more functions or services is granted), the various aspects of the present disclosure are not so limited. Captive portals are often used by business centers, airports, hotel lobbies, coffee shops, and other venues that offer free Wi-Fi hot spots for Internet users, and as such some applications of the present disclosure may include such uses, while others are adapted for e.g., enterprise or government or private commercial use.

The UI includes visual feedback functions which enable intuitive use. For example, if the client selects to install the Roku app 355 by clicking on the portal icon, then the icon lights turn green if the app is compatible with the target CPE device (the information 360 for which is shown on the UI). Cost if any is also displayed via other graphic elements 361.

Figure 3B:
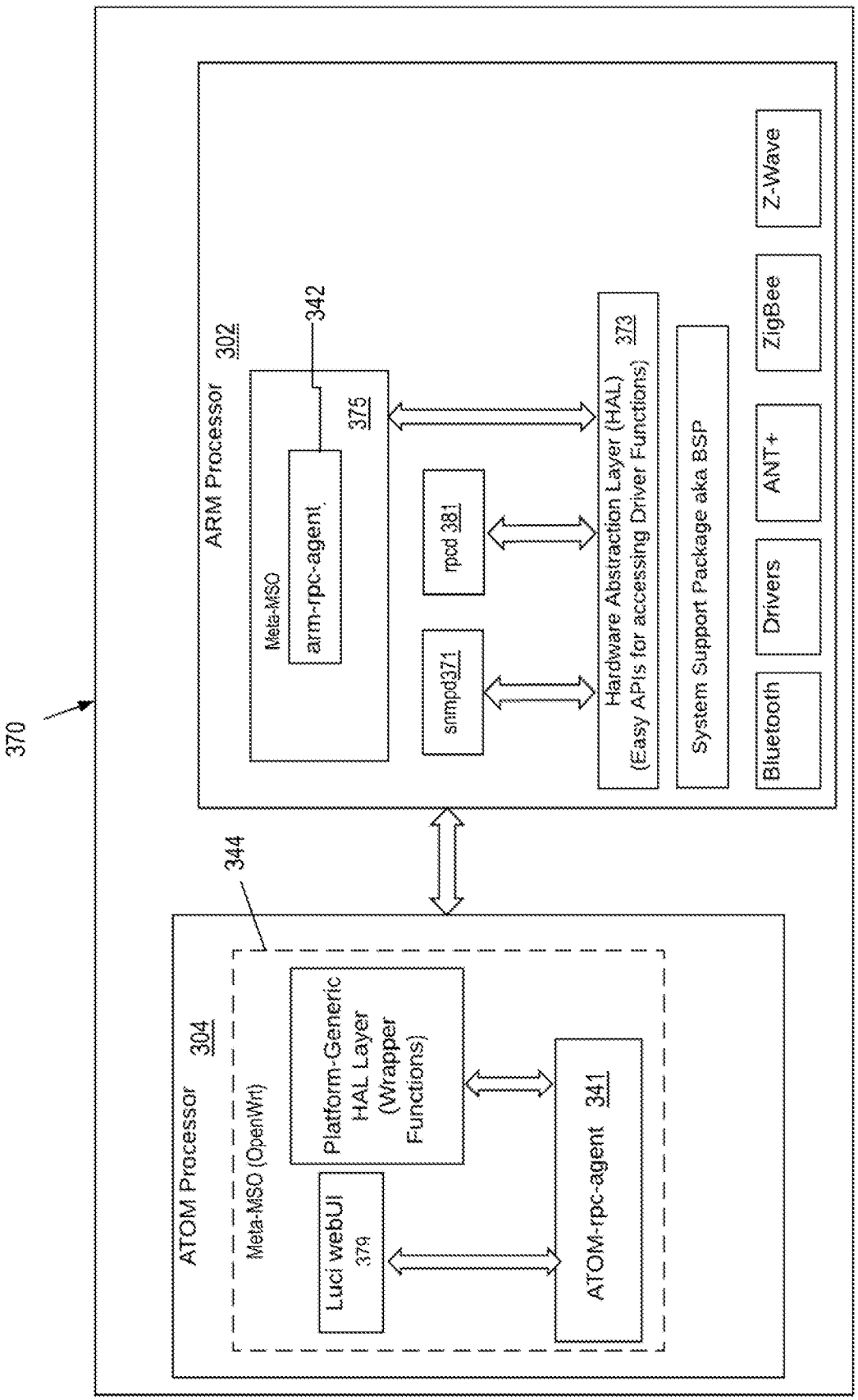
FIG. 3B is a block diagram illustrating one embodiment of a software architecture used within the portal-enabled gateway 209 of FIGS. 2 and 3.

FIG. 3B illustrates an exemplary implementation of the exemplary gateway 209 of FIG. 3, specifically in terms of its software architecture 370. In this implementation, the two different processors 302, 304 comprise an ARM core within a baseband SoC and an Atom SoC device. The stack is executed on the ARM processor, and host device OS functions and application software is executed on the Atom processor. In this implementation, the software architecture on the ARM processor 302 includes hardware drivers and supporting protocols for various hardware components such as LEDs, and IoT devices such as ZigBee and Z-Wave air interfaces. A Hardware Abstraction Layer (HAL) 373 is also utilized, which includes APIs that enable access to the hardware components. One role of the HAL 373 is to decouple the hardware components from the software components 371, 381, 375 above the HAL. In this implementation, the OEM vendor proprietary software on the Atom processor 304 is replaced (e.g., at time of firmware build) with OpenWrt-based software components which are part of the described architecture.

As a brief aside, OpenWrt in an open source Linux-based firmware development system built by a community of users, which can allow creation of new functionality by providing firmware and an open source build system that permit customization and personalization of the software on a given device. OpenWrt is one example of a broader class of environments providing similar functionality which may be used consistent with the present disclosure. For instance, in one variant, the Yocto-based RDK-B (Reference Design Kit for Broadband) environment can be used consistent with Linux OS systems. It will further be appreciated, however, that the various aspects of the present disclosure are in no way limited to the exemplary Linux OS embodiments described herein, in fact, the methods and apparatus described herein may be readily adapted to non-Linux OS implementations by those of ordinary skill when given the present disclosure.

OpenWrt features a writable root file system, which has the advantages of, inter alia: (i) enabling users to modify any file, and (ii) enabling easy installation of additional software. This is to be contrasted with other types of firmware based on monolithic read-only file systems which require a rebuild and re-flash of the firmware image into the target device.

Of further note is the developer base associated with the exemplary OpenWrt environment described herein. Specifically, by selection of an environment which is broadly supported by developers, the development base for e.g., applications which may be utilized with the gateway apparatus 209 or other target device (e.g., EUD) is expanded. Stated simply, more people will be developing applications which may be utilized within the environment, and hence the range of possible functionality that may ultimately be included within the feature set of the final firmware "build" is arguably greater.

Additionally, through selection of an "open" environment such as OpenWrt, the various functionalities described in the present disclosure are accessible to a broader audience, in contrast to: (i) the vendor proprietary firmware environment which requires a specific developer's license (and associated cost and management complexities), and (ii) the "pseudo-closed" environment of e.g., RDK-B, for which access is limited to only members of the organization. In contrast, literally any user can access and utilize the OpenWrt SDK and environment as described here, thereby advantageously adding ubiquity.

Referring again to FIG. 3B, a meta-MSO layer 344 with Open-Embedded metadata for the OpenWrt package was created and integrated with a silicon vendor SDK (e.g., an exemplary Intel SDK-Atom stack; see FIG. 4), which includes the wrapper functions for OpenWrt platform communications. It is noted that in the present embodiment (i.e., Atom and ARM cores), replacement of the vendor proprietary firmware with OpenWrt OS required use of the Atom processor 304 to run the OS, because the particular ARM core architecture of the particular implementation does not sufficiently support OpenWrt (i.e., due to comparatively limited processing power relative to the Atom Host CPU 304. It will be appreciated, however, that in alternate configurations (including those where the application/baseband processor 302 supports the chosen OS environment), the stack of the application processor may be modified similar to that of the Atom stack in the present embodiment.

In the embodiment of FIG. 3B, RPC agents 341, 342 on both the ARM processor and Atom processor respectively are used, in order to facilitate a "single communications point" approach to and from the Atom processor 304. This type of architecture is not limited to the exemplary gateway 209, but rather can be extended to any number of other types of CPE (e.g., a cable modem, CBRS FWA CPE), or even EUD. The Atom RPC agent 341 and associated Platform-generic HAL layer 373 cooperate to enable inter-process communication between the processors, and support device functions below the HAL. A Luci webUI component 379 is also provided to display the CM-specific information for e.g., a remote user interface (see discussion of FIG. 3B supra).

Figure 4:
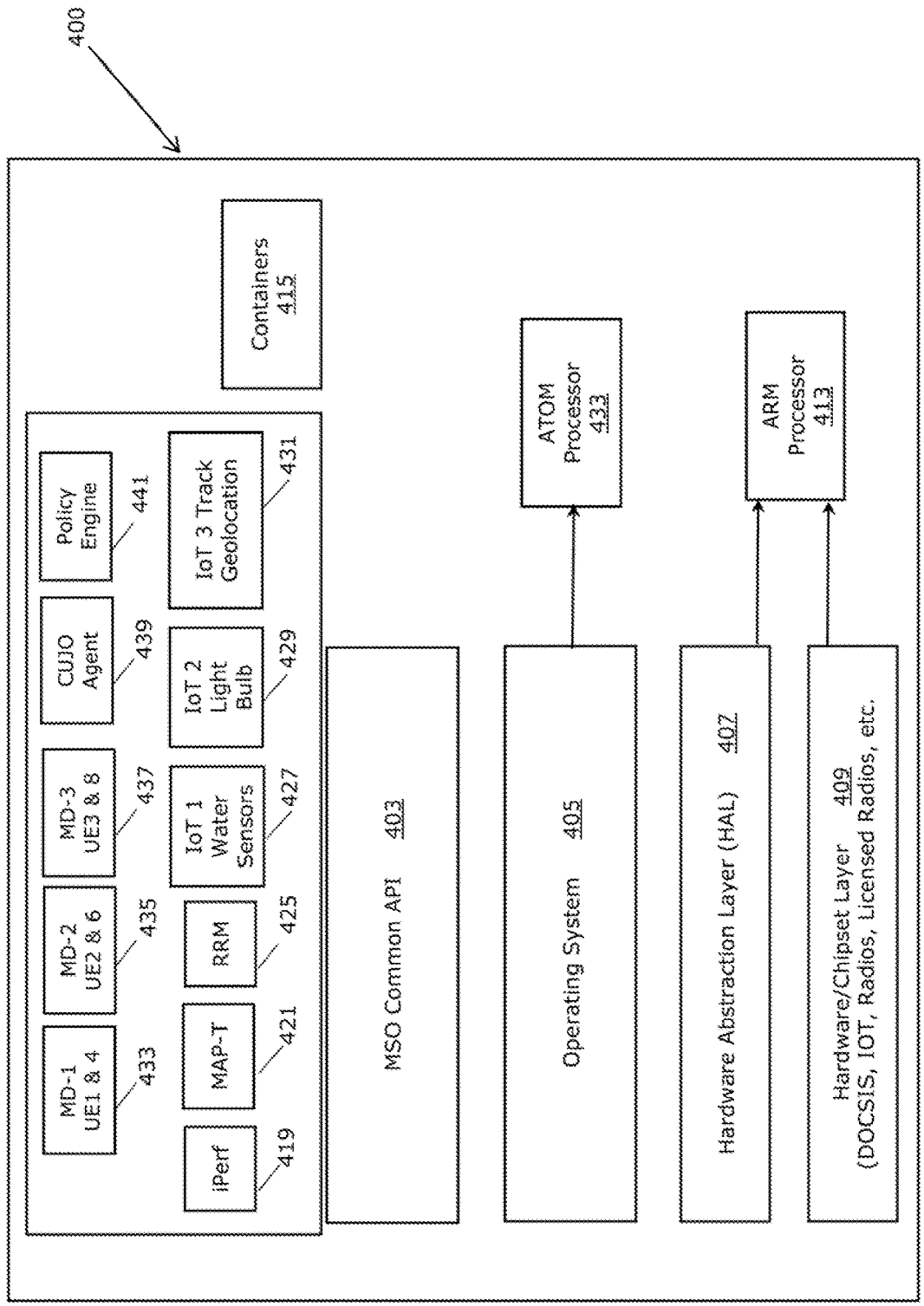
FIG. 4 is a graphical representation illustrating one example of OpenWrt-enhanced, portal-enabled gateway hardware and software architecture according to the present disclosure.

Referring to FIG. 4, one implementation of the software architecture of the Gateway/Router 209 relative to the Atom and ARM processors is shown. A services container 415 include various independently managed applications or services such as iPerf speed test 419, MAP-T 421, RRM 425, IoT-1 427, IoT-2 429, and IoT-3 431. The software containers iPerf, MAP-T, RRM, IoT-1, IoT-2 and IoT-3 used with OpenWrt, advantageously modularize the device software build release, by isolating each network function, which reduces operational changes and testing time. Containers and their contents are created by the cognizant entity (e.g., MSO or third-party app developer) either within the MSO cloud (shown) or a public cloud service.

As previously discussed, app and services can be easily deployed when integrated with the gateway/router 209 if they are created using OpenWrt or if they are containerized. Also, if the multiple hardware devices/hubs are integrated into the home gateway/router it reduces the customer effort needed to understand, set up, and maintain multiple disparate systems within the home. In addition, if the communication protocols (e.g., software communication protocols among the containers and the OpenWrt OS) that these disparate hardware devices use are based on OpenWrt or containerized, these separate hardware devices are no longer needed. In this case, the communication protocols are integrated within router/gateway, and thus the client is able to view and manage all of them via one device and associated user interface.

For examples, the containers 415 in FIG. 4 described below, illustrate the concept described above:

The iPerf speed test 419 is run to measure the downstream and upstream throughput on the WAN interface (e.g., DOCSIS CM) of the device.

The exemplary MAP-T container 421 provides IPv4 to IPv6 address translation.

The Radio Resource manager (RRM) 425 feature is used in conjunction with a wireless-enabled gateway device, such as the apparatus 209 of FIG. 3.

The IoT containers manage IoT devices in the premises network, which may include for example the IoT hardware interfaces 345 of the gateway, or even devices in wireless communication therewith.

IoT-1 427, IoT-2 429, and IoT-3 431 are examples of IoT containerized apps/containers; IoT-1 supports water sensors, IoT-2 supports lighting components and IoT-3 helps to track users (e.g., geolocation) within the premises.

Also shown in FIG. 4 are additional containers MD-1 (UE-1 and UE-4) 433, MD-2 (UE-2 and UE-6) 435, MD-3 (UE-8 and UE-3) 437, a CUJO Agent 439, and a Policy Engine 441

Figure 5A:
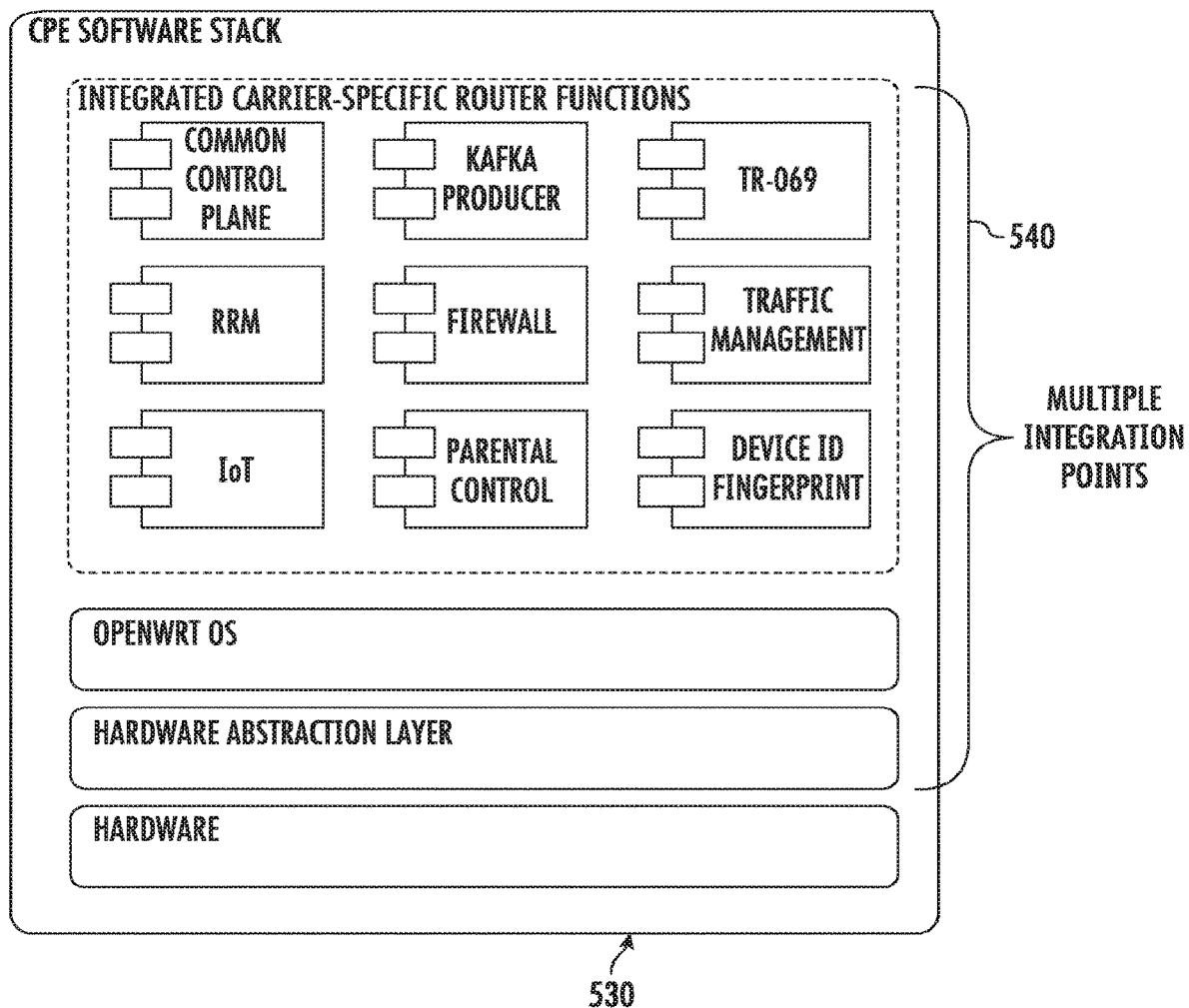
FIG. 5A is a graphical representation illustrating one example of a prior art gateway monolithic software stack, showing multi-point integration access.
Figure 5B:
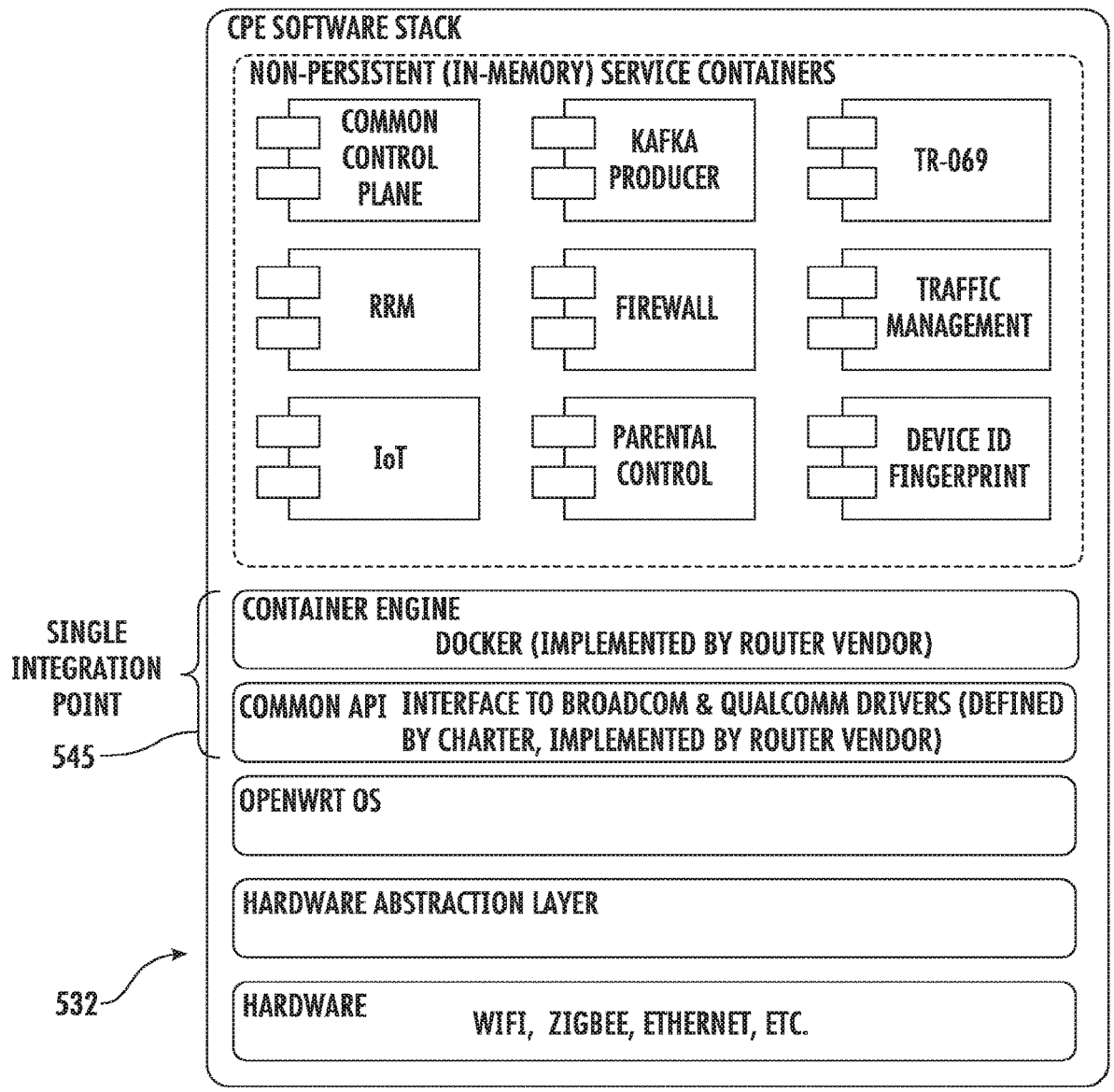
FIG. 5B is a graphical representation illustrating one example of an OpenWrt-based gateway software stack according to the disclosure, showing single-point integration access.

As shown in FIGS. 5A and 5B herein, the exemplary embodiments of the present disclosure also advantageously permit a unified or single access point 545 for each of the integrated features via (i) the common API (in this case which is MSO-defined, thereby adding additional flexibility over the prior art approach 530 of FIG. 5A having multiple integration points 540), and (ii) use of a container engine (e.g., "Docker").

Managed Network Architecture

Figure 6:
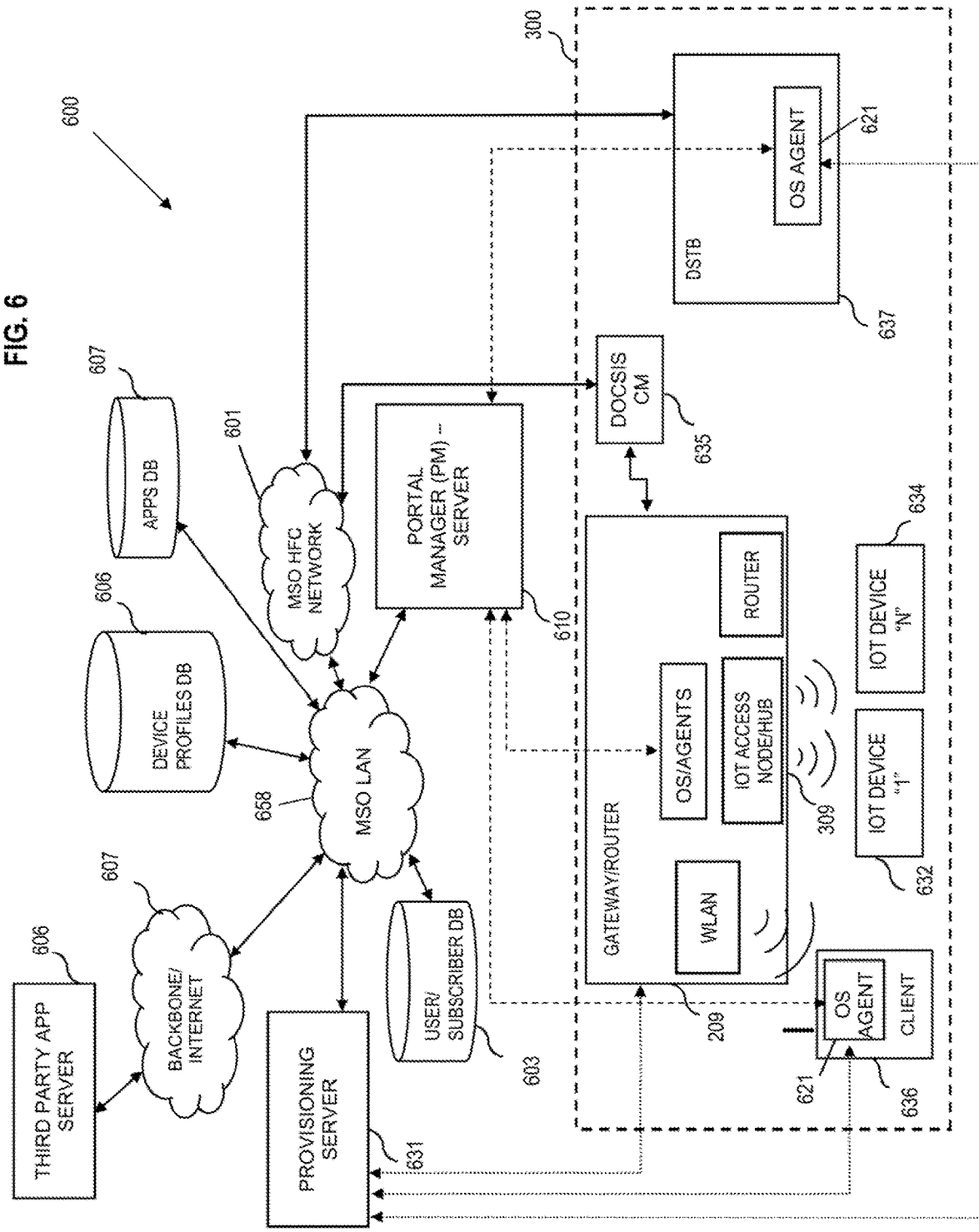
FIG. 6 is a functional block diagram illustrating an exemplary hybrid fiber network configuration useful with the MSO portal-enabled gateway and EUDs of the present disclosure.

Referring now to FIG. 6, an exemplary architecture for user or subscriber premises characterization and management (including network-assisted functions such as population of the user's Portal UI or new service selection/delivery), is shown and described in the context of a managed content delivery network.

As a brief aside, in order to support operational flexibility (and to gain operational and economic efficiencies), technology stacks such as those used in the premises devices of FIG. 2 have over time generally migrated towards the "cloud" or network side of the foregoing managed service provider networks (e.g., into regionalized data centers), and away from the end user (client) consuming devices. Hence, the CPE or client device's functionality and presentation capabilities are dictated increasingly by these cloud-based functions (including network-side app and guide data generation architectures), along with the on-board storage and processing power of the client device and its associated software stack. This "cloud control" provides the network operators significant opportunities in terms of user/premises customization and personalization, whether relating to service configuration (e.g., content delivery, telephony, multi-service fusion, or yet other functions). Data regarding user/premises activities (e.g., data consumption patterns, devices used for certain functions/services, channel changes, programming selections, app purchases made by the user, IoT device installation and connectivity, etc.) can be sent up to the cloud for analysis and storage, including generation of user-specific, premises-specific, and/or device-specific profiles that can be used for later configuring services provided to that particular user/premises/device, including for the MSO portal described herein.

For example, the exemplary cloud-based MSO portal described herein can be configured to provide a customizable and user-specific experience (e.g., populating the portal with apps, service options targeted for the particular user/premises, and listing particular user-specific devices), as well as the additional aspects of reduced device processing and storage footprint, and a consistent and simple mechanism for software upgrades across multiple different types of HW/SW platforms (e.g., different OEM devices). Exemplary app implementations such as the cloud-based Spectrum Guide offered by the Assignee hereof integrates data from multiple sources in forming an aggregated user interface with which the user interacts via their premises client device (e.g., Smart TV, DSTB, or mobile device). As such, a similar approach may be used with the MSO portal described herein, such that e.g., user-specific content, look and feel, app selection, device selection, etc. can be readily implemented and controlled from the MSO cloud as desired.

Also useful to the MSO is data relating to the user's premises equipment and configuration. For example, configuration control of a user's gateway, DSTB, wireless access point (e.g., Wi-Fi AP), cable modem or EUD is increasingly being pushed to cloud-based functions so as to provide the aforementioned benefits to varying degrees; e.g., customization of a particular user premises device, obviating service calls (aka "truck rolls"), and diagnosis/troubleshooting of user premises devices.

Returning to FIG. 6, the architecture 600 generally utilizes the network operator's (e.g., MSO's) extant infrastructure including the MSO LAN 658, HFC network 601, and MSO backbone and internetworking function 607 (for e.g., providing broadband connectivity to the Internet and third-party web or other servers 608), as well as additional components and functions as now described. Specifically, in the illustrated embodiment, the architecture 600 further includes a client Portal Manager (PM) process 610, user/subscriber database (DB) 603, provisioning server 631, and device profiles DB 606. It will be appreciated that while shown as two (2) data repositories 603, 606, these DBs stores may be combined, or alternatively comprise multiple distinct storage entities, including those operated or maintained by non-MSO third-parties, the illustrated configuration being merely exemplary. Moreover, the storage entities 603, 606 may be physically and/or topologically distributed within the MSO network or otherwise, such as where a plurality of local stores are utilized to service different geographic regions served by the MSO.

The PM server entity 610 is, as described in greater detail below, configured to interface with various other network and/or client functions (depending on delivery modality) to manage premises portal and device configuration functions include portal UI content and recommendations, compatibility checks, service offerings, etc.

The provisioning server 631 is utilized to provision CPE or EUD devices 706 with application layer software or middleware 621 which implements the device characterization techniques used in support of evaluating and classifying various devices in use within the premises of interest. Specifically, in one variant, only the portal-enabled gateway/router 209 includes the necessary software components for communication with the PM server 610, and the other EUD and CPE devices within the premises are used in their respective "as built" configurations; information regarding their configuration is gleaned passively from other sources such as the USER and Device Profiles DBs 603, 606, query to extant processes on the device (e.g., some devices may include middleware, APIs, or other functions as installed which can be accessed by the PM server or the gateway/router 209.

Alternatively, the EUDs and CPE can be equipped with client OS agents or processes 621 as shown in FIG. 6 to actively provide device configuration from each of the premises devices managed by the MSO portal of the gateway 209, such as via e.g., API call by the gateway or the PM server to a port on the managed device over whatever transport is available (e.g., LAN, WLAN, BLE, 802.15.4, DOCSIS modem QAM channel, IB/OOB QAM channel, etc.). The API executing on the client agent 621 retrieves e.g., MAC address, firmware revision, device memory capability, OS type/version, or whatever information is relevant to determining e.g., compatibility of a given app for that device.

The provisioning server 631 also communicates with the client database 603 and/or device DB 606 via the MSO LAN 658, such as to (i) obtain client device configuration information, MAC address, or other information useful in characterizing the individual client devices (CPE or EUD) in the event that such devices have already been registered with the MSO and characterized; (ii) correlate individual client devices with particular network (e.g., IP) or other addresses; and (iii) obtain demographic data relating to user(s) of the devices, via e.g., subscription or service data, historical tuning activity, app downloads, or other mechanisms.

The provisioning server 631 also maintains, for each CPE/EUD provisioned, data relating the OS agent or client 621 such as installation status, version, etc. if applicable.

Methodology

Figure 7:
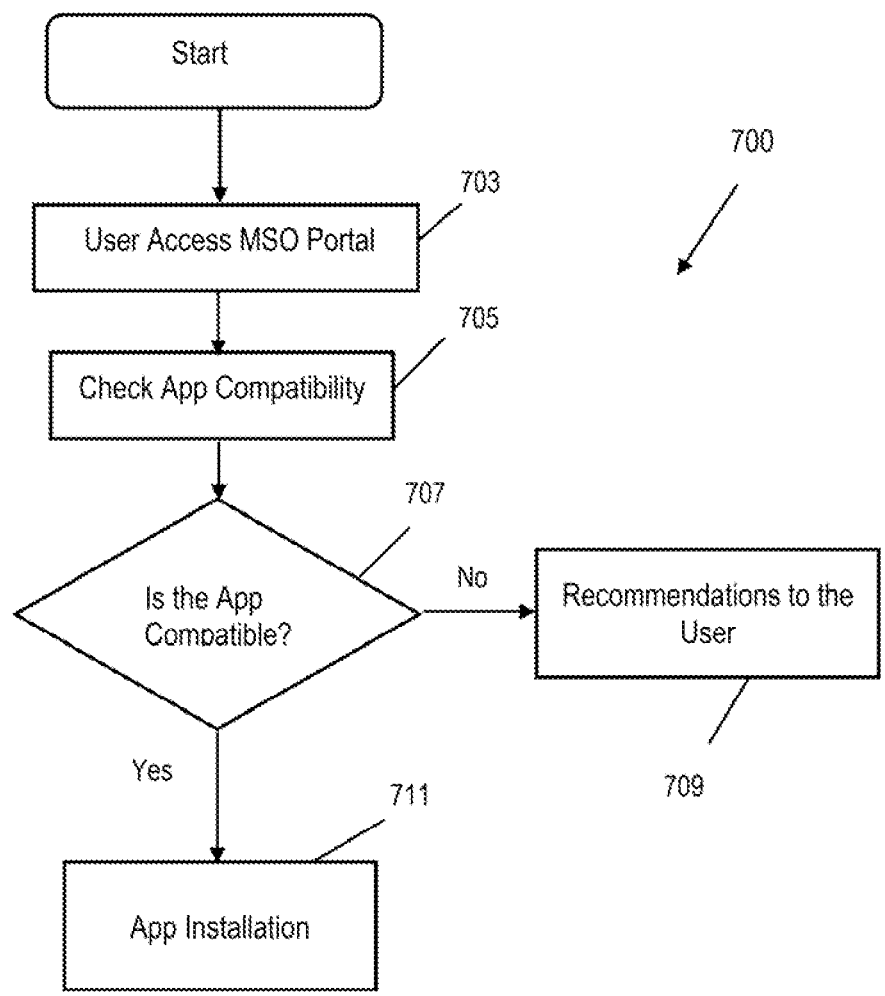
FIG. 7 is a logic flow diagram illustrating an exemplary generalized method for on-boarding of software according to the present disclosure.

Referring to FIG. 7, a generalized embodiment of a method of on-boarding procedure for a third application or other software/firmware component is described. This methodology accomplishes, among other things, the initial evaluation or compatibility check with the software environment of the premises gateway managing the particular premises.

As shown, at step 703 of the method 700, the user accesses the MSO portal (e.g., via the interface of FIG. 3B) and selects an app for possible addition to a device.

Next, per step 705, the MSO portal checks the selected app compatibility with the router/gateway; i.e., in the exemplary embodiment, whether the app is sufficiently compatible with OpenWrt OS and container environment utilized by the gateway/router.

Per step 707, if the app is compatible with the router/gateway, the portal recommends the app for installation, or recommends further actions to the user on how to proceed.

Figure 7A:
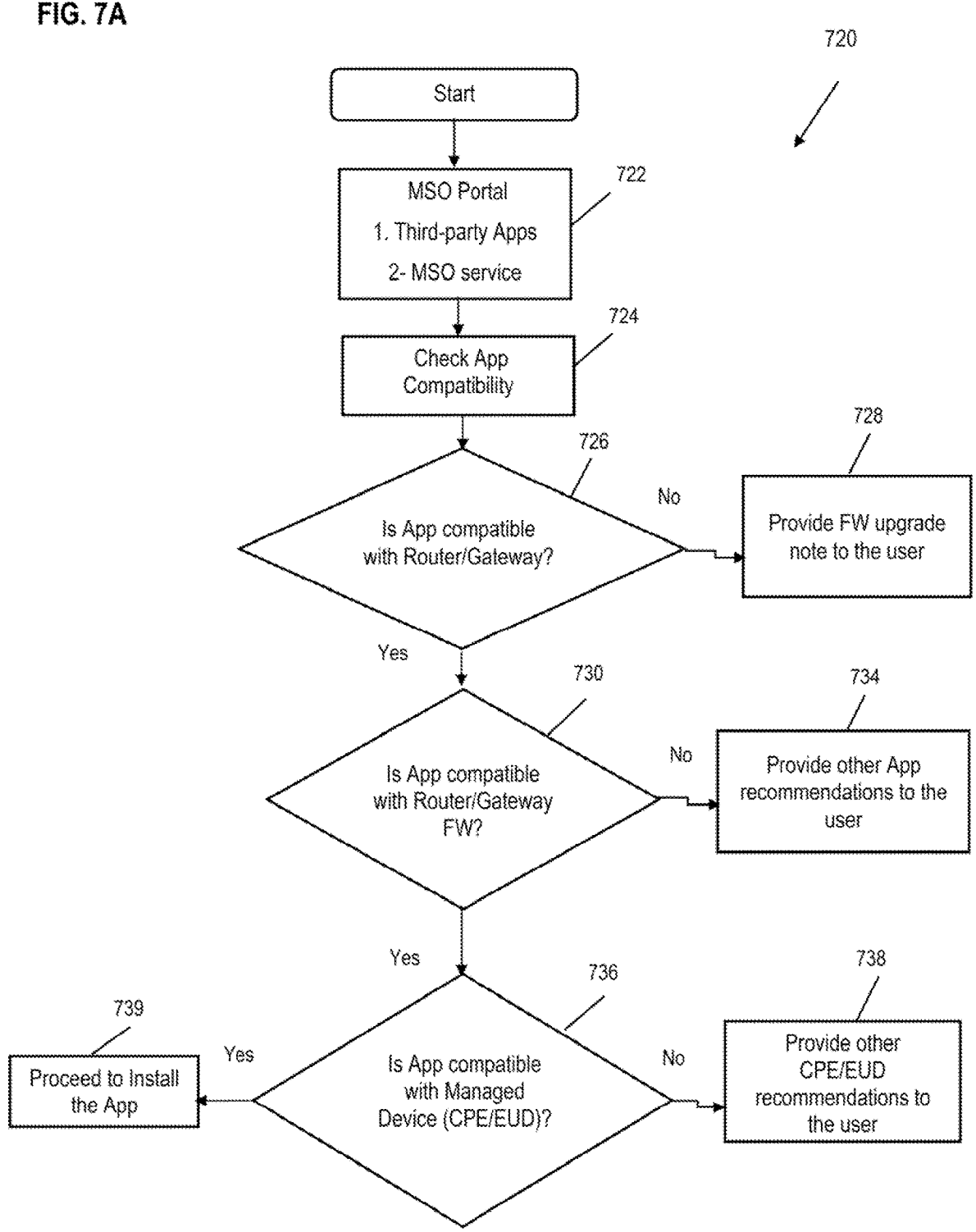
FIG. 7A is a logic flow diagram illustrating an exemplary implementation of the generalized method of FIG. 7, wherein app compatibility is algorithmically checked by the MSO portal.

Referring now to FIG. 7A, one variant of the method of FIG. 7 according to the present disclosure is shown and described.

As shown, per step 722 of the method 700, the MSO portal presents apps and/or service options (e.g., both third-party and MSO-developed app) to the user. In response, the user selects an app or service for e.g., download.

In one approach, if the selected app is a third-party app, the MSO portal checks the app compatibility at step 724. Alternatively, the portal checks the compatibility of all apps regardless of category or origin.

In one exemplary implementation, an MSO-installed agent on the CPE (e.g., the gateway 209) can check third-party app compatibility in various ways. For instance, the agent may be configured to (algorithmically) perform one or more of the following queries or checks when executed:

1. Is the third-party app or device (such as e.g., its IoT firmware version) compatible with the OpenWrt Gateway firmware version?
2. If the answer to Step 1 above is "no," identify the recommended or latest firmware version. This query is accomplished via an API call to a MSO database (see e.g., the device profiles DB 606 of FIG. 6) for the field-deployed gateway 209 to check the compatibility list.
3. When installing the app, are all (i.e. a complete set) of the runtime permissions associated with the app granted for the particular installation, or should some of these permissions be disallowed? In one approach, this query is performed by the Policy Engine 441 (see FIG. 4).
4. Is the third-party (e.g., non-MSO supplied or OEM) device installed in the designated micro-domain? In one approach, the CUJO agent 439 will automatically assign the third-party device to a group of devices with a similar design intent, logical context, or function, or alternatively the subscriber can manually perform the assignment. For example, all medical or healthcare-related devices may be logically aggregated into a common device micro-domain.

5. For IoT devices, can a given IoT device send the user data to a third-party service provider (associated with the third-party app being installed thereon) using the MSO's network? In other words, does the MSO have any filters or firewalls to prevent the collected data from being received by the third-party service provider, or conversely, if the third-party service provider must send the IoT device/app data, is such data accessible by the IoT device/app via the MSO network?

6. If the answer to the query of Item 5 above is negative, then in one exemplary implementation of the gateway agent, logic is used to cause creation or modification of an SLA (service level agreement) and associated communication channel via the MSO network to enable the requisite functionality. For example, if a medical IoT device requires privacy using a "tunnel" (e.g., encrypted VPN or the like) from the gateway/router 209 to the third-party medical review agent in order to preserve patient confidentiality, etc., the agent may make an API call to a cognizant MSO backend process (e.g., an MSO policy or other server) to cause creation of the tunnel between the gateway and the third-party medical review agent.

7. Are any unsupported APIs or platform libraries needed to enable the third-party (e.g., IoT) device to work within the MSO network?

8. If the answer to Item 7 above is "yes," are they currently installed or accessible to the device?

9. If the answer to Item 8 above is "no," cause identification and access to the requisite APIs or platform libraries by the device/gateway 209.

Returning again to FIG. 7A, per step 724, the compatibility check is based on the gateway/router. For instance, in one embodiment, the compatibility check determines whether the target app or software element is compatible with the current OS version of the gateway (e.g., OpenWrt version and libraries in the exemplary gateway implementation discussed previously). If incompatible: (i) one or more of the gateway/router firmware and libraries must be updated; or (ii) a check for a newer/compatible app version is performed (e.g., via API call to a MSO or outside server), or (iii) both (i) and (ii) are performed. Step 728 of FIG. 7A illustrates one such approach (i.e., firmware upgrade recommended).

Next, per step 730, if/when the compatibility of step 726 is established (e.g., the algorithm of FIG. 7A may iterate once the "fixes" have been implemented to confirm compatibility per step 724), the MSO portal checks the app compatibility with gateway/router firmware. If it is not compatible with the firmware, per step 734, the MSO portal recommends one or more other apps to the user which are compatible with the present firmware image. In one implementation, the aforementioned gateway agent process makes an API call to an MSO database to check an extant compatibility list of third-party apps and devices. Other approaches may be used as well, as will be appreciated by those of ordinary skill given the present disclosure.

Next, per step 736, if the compatibility of steps 726 and 730 is/are established, the MSO portal checks if the app is compatible with the managed device (EUD or another CPE other than the GW). If the app is compatible with the managed device, the MSO portal proceeds with the app installation per step 739. If it is not compatible with the managed target platform, the MSO portal provides recommendations on other managed devices within the premises topology that are compatible with the app to the user.

Figure 7B:
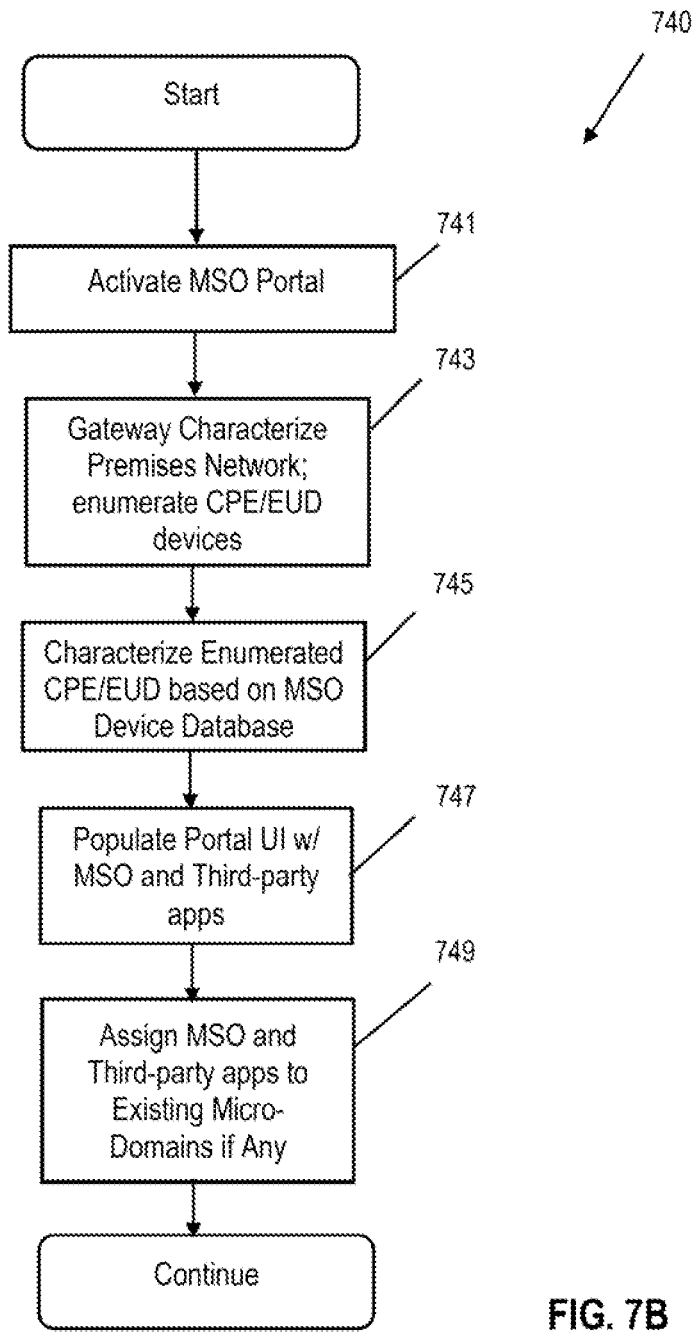
FIG. 7B is a logic flow diagram illustrating an exemplary method for premises network and device characterization according to the present disclosure.

Referring now to FIG. 7B, one embodiment of a method for premises network characterization and CPE/EUD device enumeration via the MSO portal is shown and described.

At step 741 of the method 740, the portal is activated, such as via the user turning on the gateway. In one variant, the MSO Portal layer 319 of the software stack of the gateway (FIG. 3) is configured to execute after device bootup, so that the portal can become aware of any CPE/EUD in the premises without affirmative user action or intervention. Once running, the portal is further configured in one implementation to periodically canvass the network/premises (using e.g., the methods described below) so as to detect any new devices which may have been added, or removal of devices from the premises. It will be appreciated, however, that in one approach, the removal of addition of a device on a transient basis need not be accounted for by the portal. That is, once associated with the premises/portal, a given EUD or CPE (e.g., a user's smartphone) stays registered with the portal (and the MSO backend via the PM server) such that upon exit and re-entry, the phone is automatically recognized as a registered device (e.g., when it comes back within range of the portal gateway's WLAN interface). Similarly, affirmative dis-association results in the portal not recognizing the device until it is re-registered; mere loss of WLAN AP association/session or other connectivity loss does not render the device "unknown" to the portal.

Per step 743 of the method 740, the gateway 209 characterizes the premises network, and enumerates the CPE and EUD therein. If the devices have not been registered with the portal or the MSO backend (e.g., PM server), the logic may request such registration from the user via e.g., the UI before the method proceeds. The enumeration may include detection of device type, MAC address, network address (e.g., if a local network address such as an IPv6 address within the premises LAN or topology has been assigned), capabilities, or other useful information. As previously discussed, in some variants, client CPE/EUD software is loaded onto the CPE/EUD to facilitate device discovery and enumeration (e.g., so as to obtain FW version number and more detailed parameters associated with the CPE/EUD than can be obtained merely in a "COTS" configuration.

For instance, a user device wirelessly associated with the WLAN AP of the gateway 209 can be queried via a portal stack "call" to the relevant EUD device process over the WLAN interface in order to return the desired data.

Per step 745, the portal stack 319 of the gateway 209 makes a call to the PM server 610 (e.g., via an API over the MSO transport backhaul) for the device data associated with the premises. In one variant, the API is structured such that the query argument is the premises service address, account number or other identifier. In one implementation, the device profiles DB 606 (FIG. 6) stores the CPE/EUD device associated with a given premises indexed by the aforementioned identifier, which can be obtained by the query to the API from the user/subscriber DB 603.

The API returns the relevant device data for the premises back to the portal stack 319, which then uses the data to either confirm an existing registration of the device within the portal, or instantiate a user interface to cause registration of the device and optionally association with a user and/or micro-domain (discussed below). The returned data from the PM server is also used to characterize the EUD more completely within the portal's local database.

Next, at step 747, the portal UI is populated with MSO and third party apps that are ostensibly compatible with the device, based on the characterization of step 745. For example, if it is determined directly by device query or MSO API call that the device is an Android OS "Oreo" or "Pie" (8.0.x or 9.0.x), and the MSO offers a streaming OTT app for smartphones/tablets, then the UI will be populated with an icon for the Android version of the MSO app (see FIG. 3B). Likewise, pre-vetted or approved third-party apps (such as Netflix or Roku apps) that are compatible with the detected OS may be added to the UI. The apps DB 607 of FIG. 6 may be used for such purposes; i.e., it stores data relating to different MSO an third party apps commonly used within the managed network so as to enable rapid compatibility assessment and selection for use in e.g., populating the portal UI.

Likewise, any IoT devices which are communicative with the gateway via the IoT interface(s) 345 can be canvassed and characterized as to OS (e.g., a small device embedded OS such as Windows IoT or Android Things) and other attributes for determination of app compatibility. Note that for IoT devices, app compatibility may be two-fold; i.e., (i) whether a given app is compatible with the APIs or other communications protocols of the IoT stack as it exists (e.g., will the app be able to talk with the indigenous software of the IoT device, which may include extant apps already on the device), and/or (ii) whether the IoT device OS and hardware environment itself will support installation and execution of the app on the IoT device itself. Depending on the architecture and configuration of the IoT device and gateway 209, one or both of the foregoing compatibility assessments may be needed.

Figure 8:
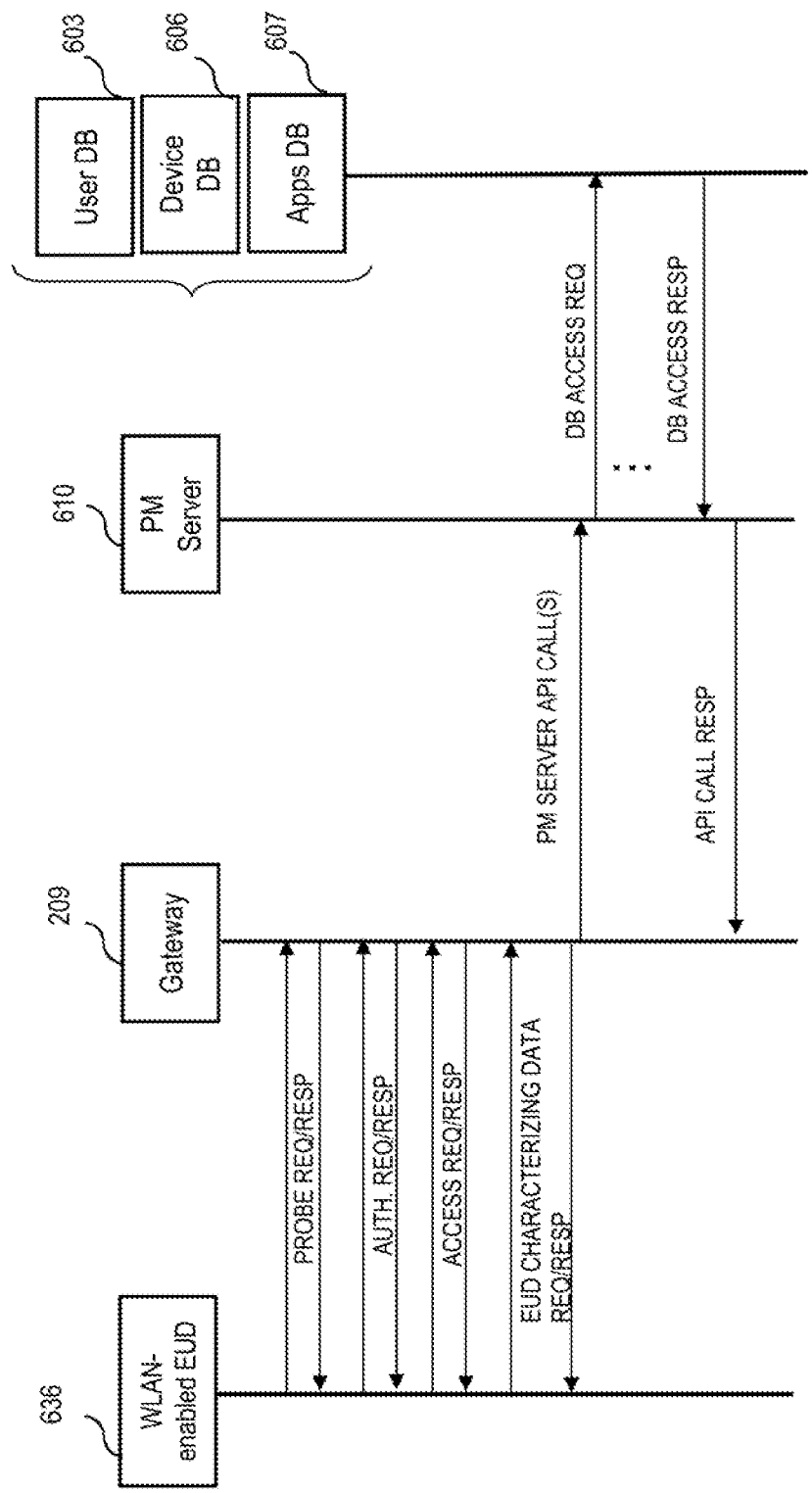
FIG. 8 is a ladder diagram illustrating one embodiment of a logical message flow with API calls for on-boarding of a WLAN-enabled EUD according to the disclosure.

FIG. 8 illustrates one embodiment of a logical message and API call protocol implementing the foregoing functionality for a WLAN-enabled EUD.

Lastly, per step 749 of the method 740, the MSO/third-party apps used to populate the display are assigned to appropriate micro-domains (if any) automatically, such as based on an app classifier or type as compared to the extant micro-domain description or type. For instance, if an IoT device (e.g., lighting system) app or "widget" is to be used by the portal for monitoring and controlling premises lighting functions, and an IoT micro-domain already exists, the app or widget classifier (e.g., given by the app author, or the MSO, or even a third party) can be compared to a whitelist of identifiers or classifiers associated with the micro-domain (whether maintained at the portal or the PM server/backend) to enable association of the app with the correct micro-domain. Likewise, the classifier can be used as the basis of establishing a new micro-domain (e.g., IoT devices") where one does not exist.

Figures 1, 7C:
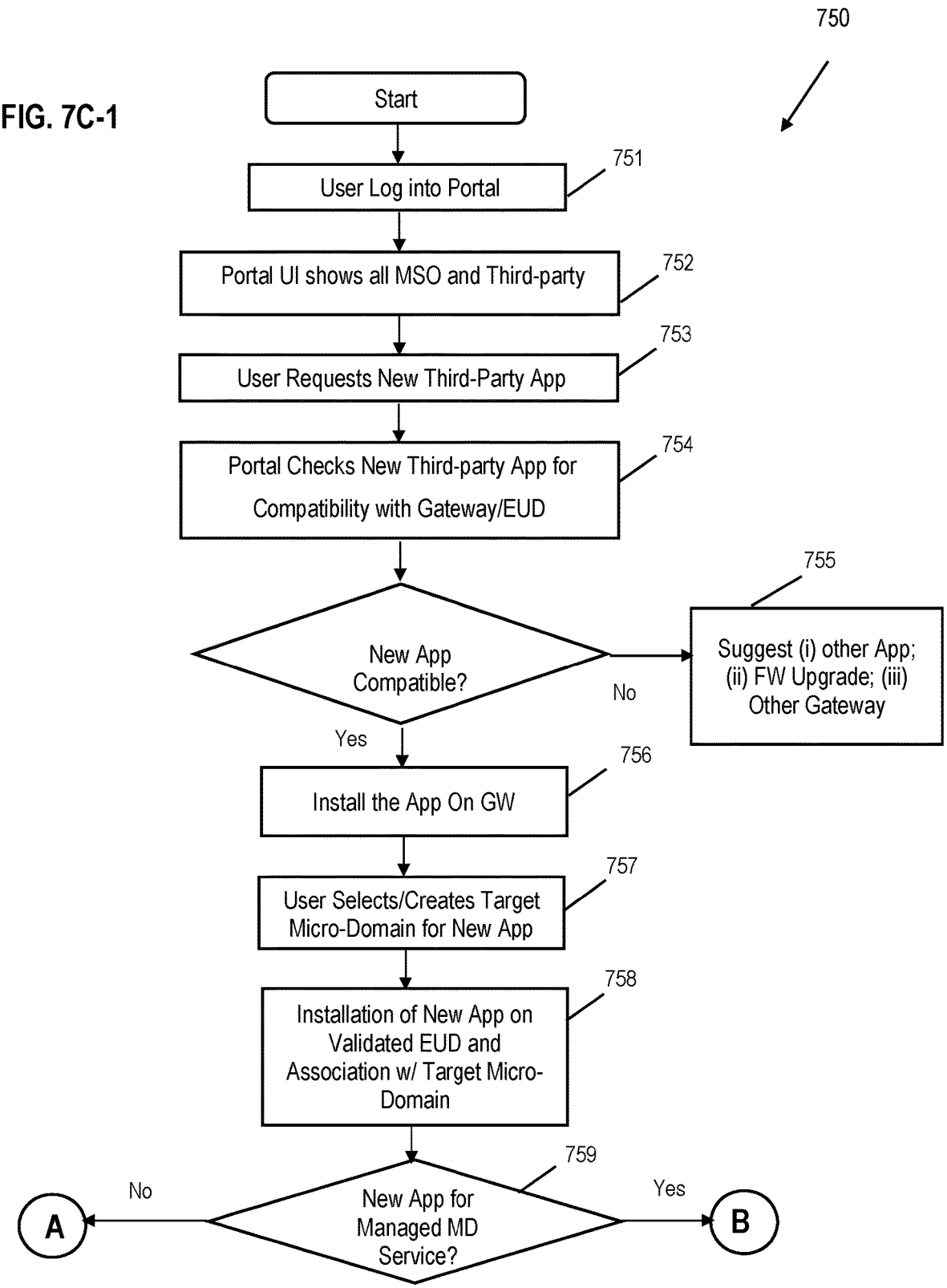

Referring now to FIGS. 7C-1 and 7C-2, one embodiment of a method for software on-boarding and installation within a set of micro-domains via the MSO portal is shown and described.

Per step 751 of the method 750, the user logs into the MSO portal to check the list of the installed CPE/EUD devices and apps. Per step 752, the portal populates the UI to show all apps/services and known devices (see FIG. 7B). Per step 753, the user requests a new third-party app; e.g., via a third-party web server or other source. Note that the MSO can act as the proxy for the third party source; i.e., the user never need provide a URL, link, access the third party site, etc., but rather can merely select it from a populated menu, type in or speak a search query (e.g., "Amazon Alexa"), etc., and the MSO backend (FIG. 6) will facilitate the necessary URL access as needed.

Per step 754, the portal checks (or causes checking by the MSO backend) the selected new app for compatibility with the target platform(s). In one embodiment, the target platform(s) includes both the gateway 209 and any EUD which is the recipient of the selected app. It will be appreciated, however, that depending on the type of app, components, and intended uses, the check(s) of step 754 may be performed on only one of the device as required.

If compatible, the method proceeds to step 756, and the new app is installed on the GW 209. If not compatible with the gateway 209, a variety of other options may be presented per step 755, including (i) suggestion of other apps that are compatible with the gateway 209; (ii) suggestion of a firmware upgrade, and/or (iii) suggestion of another gateway device that the user may use. For example, a user may be placed in contact with an MSO customer care or service agent to identify possible replacement devices, service upgrades, etc. which will resolve the compatibility issue.

Per step 757, after app install, the user selects or creates a micro-domain within which the app will be associated. For example, in the context of FIGS. 3A and 3B, one of the micro-domains may be a "home medical device" domain, an "IoT" domain, a "Parent/child" domain, or any other logical or other relationship or categorization of utility to the individual user/premises. Note that each user and each premises can individually configure their domains, and moreover an app may be associated with two or more domains simultaneously. For instance, an IoT device used for medical monitoring purposes might be associated with both IoT and medical logical micro-domains, and hence an app for utilizing the device might also be associated with two of the micro-domains established by the user (e.g., "medical" and "IoT").

Per step 758, the new app is installed on the target device (e.g., EUD such as the user's smartphone), and the app is associated logically with the one or more micro-domains selected by the user in step 757.

At step 759, it is determined whether the new app is associated with a new managed micro-domain service. If so, then a new SLA (service level agreement) is obtained for the new services. In the exemplary embodiment, the micro-domains engine 320 (see FIG. 3) groups "similar" device types together in order to optimize the network environment for optimal performance. For instance, the methods and apparatus described in U.S. patent application Ser. No. 16/115,976 filed Aug. 29, 2018, entitled "SYSTEM ARCHITECTURE AND METHODS FOR CONTROLLING AND MANAGING NETWORKING DEVICES AND EXPEDITING NEW SERVICE DELIVERY IN A SUBSCRIBER'S HOME NETWORK USING MICRO-DOMAINS," which is incorporated herein by reference in its entirety, may be used consistent with the gateway apparatus 209 of the present disclosure in implementing such grouping or related functionality. Some services associated with a specific micro-domain or micro-domains require coordination with a third-party for e.g., review or monitoring, such as in the previously described context of an IoT-based medical device that measures blood glucose or some other critical health parameters. If a new IoT or other such device is on-boarded to the premises, a new or modified SLA may be needed to authorize data access by the third-party in support of the requisite review or monitoring. Similar logic applies to e.g., security device contexts (e.g., monitoring of a premises by a third-party security contractor such as ADT, utilities monitoring (e.g., electricity usage monitoring and active control of IoT-based devices by a utility, water consumption/intervention on a premises in the case of a gross leak, and so forth).

Returning again to FIG. 7C-2 (step 760), and once obtained, policies such as QoS, parental control, when to invoke security monitoring, when to invoke active measures on utility intervention, etc. are defined as needed per step 762, and the services enabled per step 764. If not a new managed micro-domain service, then the method 740 proceeds directly to step 762.

It will be appreciated that the exemplary micro-domain platform referenced above is an example of an MSO developed platform for managing and displaying all devices and apps for a given premises or account. Referring back to FIG. 3, the software stack of the gateway in this embodiment includes a micro-domain engine 321 which when executed segments the premises network automatically, and assigns the apps and devices to the associated segments. For example, if a specific parental control app is downloaded from Google play for an EUD (e.g., an Android phone), the subscriber will be assured that the app is compatible with an EUD. After the app has passed the compatibility test, the client can use the micro-domain (via the UI) to view to assign that app to a specific Android phone in e.g., the "Parents" micro-domain. The "Parents" micro-domain is a collection of apps that are appropriate for the responsible adult(s) in the home and accessible to children, visitors or others. In this instance, the use of a micro-domain enforces the integrity of a parental control app by isolating that app and its associated EUD to the intended "Parents" to prevent children from altering features of that app.

For instance, consider the scenario where there are three phones at the user's home—two of them belong to the parent, and one to a child. If the new app is a parental control statistics viewer, the parent's phone can receive the app because their phone belongs to the "Parents" portal. The "child-safe" portal will not allow that app to be installed on the child's phone.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A software architecture for use in a computerized premises device of a managed content distribution network, the software architecture enabling compatibility between a plurality of application software components and a plurality of computerized devices associated with the computerized premises device, the plurality of computerized devices having heterogeneous hardware and firmware configurations, the software architecture comprising:
an open-source operating system (OS) having a plurality of containerized application software components operative to execute on a first processor apparatus; and
a container engine software layer having a plurality of components operative to execute on the first processor apparatus, the container engine software layer being communicative with the open-source OS and configured to support the plurality of containerized application software components;
wherein the open-sourced OS and the container engine software layer are cooperative to enable communication between each of the plurality of computerized devices and the computerized premises device using software on each of the plurality of computerized devices which is compatible with at least one of the plurality of containerized application software components and the open-source OS and which is abstracted above its respective computerized device hardware and firmware configuration.

2. The software architecture of claim 1, further comprising a portal layer operative to execute on the first processor apparatus, the portal layer configured to generate user interface (UI) elements associated with (i) at least a portion of the plurality of computerized devices, and (ii) at least a portion of the plurality of containerized application software components;
wherein the portal layer is further configured to enable installation of the at least portion of the plurality of containerized application software components on corresponding ones of the at least portion of the plurality of computerized devices based on user input received via the UI elements.

3. The software architecture of claim 1, wherein:
the open-source OS comprises an OpenWrt-based OS;
the container engine software layer comprises a docket-based software layer; and
the plurality of containerized application software components comprise a plurality of respective network operator applications configured to enable instantiation of a new service for the computerized premises device, the new service delivered via the managed content distribution network.

4. The software architecture of claim 1, further comprising a portal layer operative to execute on the first processor apparatus, the portal layer comprising a hardware compatibility determination process and a firmware compatibility determination process;
wherein a determination of the compatibility of the software with the at least one of the plurality of containerized application software components and the open-source OS comprises use: (i) the hardware compatibility determination process to evaluate a compatibility with hardware of at least a portion of the plurality of computerized devices, and (ii) the firmware compatibility determination process to evaluate a compatibility with firmware of the at least portion of the plurality of computerized devices.

5. The software architecture of claim 4, wherein:
the at least portion of the plurality of computerized devices comprise at least one of (i) a Smart TV, or (ii) gaming device;
the computerized premises device comprises a gateway in data communication with the managed content distribution network; and
the portal layer is configured to enable the at least one of (i) the Smart TV, or (ii) the gaming device to interface with the gateway to enable software on-boarding for the at least one of (i) the Smart TV, or (ii) the gaming device.

6. The software architecture of claim 1, further comprising a portal layer operative to execute on the first processor apparatus, the portal layer configured to generate user interface (UI) elements associated with at least a portion of the plurality of computerized devices;
- wherein the UI elements enable transmission of device configuration information associated with the at least portion of the plurality of computerized devices, the device configuration information useful in identifying the software on each of the plurality of computerized devices which is compatible with the at least one of the plurality of containerized application software components and the open-source OS.

7. Computerized apparatus, comprising:
a first processor apparatus;
a data interface in data communication with the first processor apparatus, the data interface configured for data communication with an end user device (EUD);
an open-source operating system (OS) having a plurality of containerized application software components operative to execute on the first processor apparatus; and
a container engine software layer having a plurality of components operative to execute on the first processor apparatus, the container engine software layer being communicative with the open-source OS and configured to support the plurality of containerized application software components;
wherein the open-sourced OS and the container engine software layer are cooperative to enable communication between a plurality of computerized devices and the computerized apparatus via use of software on each of the plurality of computerized devices which is compatible with at least one of the plurality of containerized application software components and the open-source OS and which is abstracted above respective heterogeneous hardware and firmware configurations of the plurality of computerized devices.

8. The computerized apparatus of claim 7, further comprising a portal layer operative to execute on the first processor apparatus, the portal layer configured to generate user interface (UI) elements associated with (i) at least a portion of the plurality of computerized devices, and (ii) at least a portion of the plurality of containerized application software components;
wherein the portal layer is further configured to enable installation of the at least portion of the plurality of containerized application software components on corresponding ones of the at least portion of the plurality of computerized devices based on user input received via the UI elements.

9. The computerized apparatus of claim 7, wherein:
the open-source OS comprises an OpenWrt-based OS;
the container engine software layer comprises a docket-based software layer; and
the plurality of containerized application software components comprise a plurality of respective network operator applications configured to enable instantiation of a new service for the computerized apparatus, the new service delivered via a managed content distribution network.

10. The computerized apparatus of claim 7, further comprising a portal layer operative to execute on the first processor apparatus, the portal layer comprising a hardware compatibility determination process and a firmware compatibility determination process;
wherein a compatibility of the software with the at least one of the plurality of containerized application software components and the open-source OS is determined via use of: (i) the hardware compatibility determination process to evaluate a compatibility with hardware of at least a portion of the plurality of computerized devices, and (ii) the firmware compatibility determination process to evaluate a compatibility with firmware of the at least portion of the plurality of computerized devices.

11. The computerized apparatus of claim 10, wherein:
the at least portion of the plurality of computerized devices comprise at least one of (i) a Smart TV, or (ii) gaming device;
the computerized apparatus comprises a gateway in data communication with a managed content distribution network; and
the portal layer is configured to enable the at least one of (i) the Smart TV, or (ii) the gaming device to interface with the gateway to enable software on-boarding for the at least one of (i) the Smart TV, or (ii) the gaming device.

12. The computerized apparatus of claim 7, further comprising a portal layer operative to execute on the first processor apparatus, the portal layer configured to generate user interface (UI) elements associated with at least a portion of the plurality of computerized devices;
wherein the UI elements enable transmission of device configuration information associated with the at least portion of the plurality of computerized devices, the device configuration information useful in identifying the software on each of the plurality of computerized devices which is compatible with the at least one of the plurality of containerized application software components and the open-source OS.

13. The computerized apparatus of claim 7, wherein the computerized apparatus comprises a gateway device of a managed service provider network, the gateway device further configured to:
receive data identifying one or more logical service groupings selected by a subscriber of the managed service provider network, wherein each of the one or more logical service groupings is defined by a device type and one or more service parameters;
identify at least one configuration associated with each of the one or more logical service groupings;
generate configuration instructions corresponding to each of the one or more logical service groupings; and
create at least one micro-domain in a premises network for each of the one or more service groupings by at least an application of the configuration instructions to one or more network services of the managed service provider network.

14. The computerized apparatus of claim 13, wherein the at least one micro-domain is optimized for the device type and the one or more service parameters of the one or more logical service groupings.

15. A computerized method for utilizing an open-source operating system (OS) having a plurality of containerized application software components operative to execute on a first processor apparatus of a computerized premises device, the computerized method comprising:
causing execution, on the first processor apparatus, of having a plurality of components of a container engine software layer, the container engine software layer being communicative with the open-source OS and configured to support the plurality of containerized application software components; and
enabling, via cooperation of the open-sourced OS and the container engine software layer, communication between a plurality of computerized devices and the computerized premises device using software on each of the plurality of computerized devices which is compatible with at least one of the plurality of containerized application software components and the open-source OS and which is abstracted above respective heterogeneous hardware and firmware configurations of the plurality of computerized devices.

16. The computerized method of claim 15, further comprising:
   causing, via use of a portal layer operative to execute on the first processor apparatus, generation of one or more user interface (UI) elements associated with (i) at least a portion of the plurality of computerized devices, and (ii) at least a portion of the plurality of containerized application software components; and
   enabling, via use of the portal layer, installation of the at least portion of the plurality of containerized application software components on corresponding ones of the at least portion of the plurality of computerized devices based on user input received via the one or more UI elements.

17. The computerized method of claim 15, further comprising causing a determination of the compatibility via use of a network interface apparatus of the computerized premises device, the network interface apparatus configured to interface with a server process of a managed content distribution network.

18. The computerized method of claim 15, further comprising utilizing: (i) a hardware compatibility determination process of a portal layer to evaluate a compatibility with hardware of at least a portion of the plurality of computerized devices, and (ii) a firmware compatibility determination process of the portal layer to evaluate a compatibility with firmware of the at least portion of the plurality of computerized devices.

19. The computerized method of claim 18, wherein:
   the at least portion of the plurality of computerized devices comprise at least one of (i) a Smart TV, or (ii) gaming device;
   the computerized premises device comprises a gateway in data communication with a managed content distribution network; and the computerized method further comprises:
   enabling, via the portal layer, the at least one of (i) the Smart TV, or (ii) the gaming device to interface with the gateway to enable software on-boarding for the at least one of (i) the Smart TV, or (ii) the gaming device.

20. The computerized method of claim 15, further comprising a portal layer operative to execute on the first processor apparatus, the portal layer configured to generate user interface (UI) elements associated with at least a portion of the plurality of computerized devices;
   enabling, via utilizing the UI elements associated with at least a portion of the plurality of computerized devices and generated by the portal layer operative to execute on the first processor apparatus, transmission of device configuration information associated with the at least portion of the plurality of computerized devices, the device configuration information useful in identifying the software on each of the plurality of computerized devices which is compatible with the at least one of the plurality of containerized application software components and the open-source OS.

* * * * *

UNITED STATES PATENT AND TRADEMARK OFFICE
CERTIFICATE OF CORRECTION

| | |
|---|---|
| PATENT NO. | : 12,015,677 B2 |
| APPLICATION NO. | : 17/844632 |
| DATED | : June 18, 2024 |
| INVENTOR(S) | : Shlomo Ovadia et al. |

It is certified that error appears in the above-identified patent and that said Letters Patent is hereby corrected as shown below:

In the Claims (Column 26, Line 54 – Column 27, Line 7 – Claim 15):
Currently Reads:
"15. A computerized method for utilizing an open-source operating system (OS) having a plurality of containerized application software components operative to execute on a first processor apparatus of a computerized premises device, the computerized method comprising:
causing execution, on the first processor apparatus, of having a plurality of components of a container engine software layer, the container engine software layer being communicative with the open-source OS and configured to support the plurality of containerized application software components; and
enabling, via cooperation of the open-sourced OS and the container engine software layer, communication between a plurality of computerized devices and the computerized premises device using software on each of the plurality of computerized devices which is compatible with at least one of the plurality of containerized application software components and the open-source OS and which is abstracted above respective heterogeneous hardware and firmware configurations of the plurality of computerized devices."

Should Read:
-- 15. A computerized method for utilizing an open-source operating system (OS) having a plurality of containerized application software components operative to execute on a first processor apparatus of a computerized premises device, the computerized method comprising:
causing execution, on the first processor apparatus, of a plurality of components of a container engine software layer, the container engine software layer being communicative with the open-source OS and configured to support the plurality of containerized application software components; and
enabling, via cooperation of the open-sourced OS and the container engine software layer, communication between a plurality of computerized devices and the computerized premises device using software on each of the plurality of computerized devices which is compatible with at least one of the plurality of containerized application software components and the open-source OS and which is abstracted above respective heterogeneous hardware and firmware configurations of the plurality of computerized devices. --

Signed and Sealed this
Sixth Day of August, 2024

*Katherine Kelly Vidal*
Katherine Kelly Vidal
*Director of the United States Patent and Trademark Office*